US011983396B1

(12) United States Patent
Percuoco et al.

(10) Patent No.: US 11,983,396 B1
(45) Date of Patent: May 14, 2024

(54) GENERATING AUGMENTED REALITY TOURS

(71) Applicant: ARTGLASS USA LLC, Richmond, VA (US)

(72) Inventors: Luigi Percuoco, Monza (IT); Alexcia Bernice Cleveland, Henrico, VA (US); Giovanni Stefanelli, Brugherio (IT)

(*) Notice: Subject to any disclaimer, the term of this patent is extended or adjusted under 35 U.S.C. 154(b) by 0 days.

(21) Appl. No.: 18/315,386

(22) Filed: May 10, 2023

Related U.S. Application Data

(60) Provisional application No. 63/340,514, filed on May 11, 2022.

(51) Int. Cl.
*G06F 3/0482* (2013.01)
*G06F 3/04847* (2022.01)

(52) U.S. Cl.
CPC ........ *G06F 3/04847* (2013.01); *G06F 3/0482* (2013.01)

(58) Field of Classification Search
CPC ............................ G06F 3/04847; G06F 3/0482
See application file for complete search history.

(56) References Cited

U.S. PATENT DOCUMENTS

| | | | | |
|---|---|---|---|---|
| 11,087,134 B2* | 8/2021 | Percuoco | ............... | G06V 20/20 |
| 11,099,016 B2* | 8/2021 | Michel | ................. | H04W 4/024 |
| 11,103,773 B2* | 8/2021 | Rathod | .................. | A63F 13/213 |
| 11,496,863 B2* | 11/2022 | Dunn, Jr. | .............. | H04W 4/024 |
| 11,532,245 B2* | 12/2022 | Klappert | .............. | G09B 29/008 |
| 2002/0002571 A1* | 1/2002 | Manohar | ............... | G06F 16/954 |
| | | | | 715/273 |
| 2018/0206069 A1* | 7/2018 | Santos | .................. | H04W 4/026 |
| 2020/0309545 A1* | 10/2020 | Michel | .................. | G08G 1/005 |
| 2021/0097893 A1* | 4/2021 | Klappert | ............. | G06F 16/9024 |
| 2021/0281972 A1* | 9/2021 | Dunn, Jr. | ............. | H04W 4/024 |
| 2022/0044019 A1* | 2/2022 | Percuoco | .............. | G06V 20/20 |
| 2022/0327642 A1* | 10/2022 | Kabir | ................. | G06Q 30/0643 |
| 2022/0397411 A1* | 12/2022 | Brown | .............. | G01C 21/3476 |
| 2023/0109923 A1* | 4/2023 | Suckle | ................. | G06F 16/487 |
| | | | | 707/737 |

* cited by examiner

*Primary Examiner* — Anil K Bhargava
(74) *Attorney, Agent, or Firm* — Aldo Noto; RIMON PC

(57) ABSTRACT

The disclosed methods and systems generate augmented reality tours. Initially, information associated with a tour place of the augmented reality tour is received. Subsequently, a set of points of interest associated with the tour place is selected based on the information associated with the tour place. Further, a plurality of nodes associated with each point of interest of the set of points of interests are generated. The plurality of nodes includes at least one of a menu node, a marker node, a location node, a scene node, a timer node, a full screen video node, an instant tracking node, and a pause node. Finally, a combination of one or more nodes of the plurality of nodes is modified to create tour paths in the augmented reality tour, thus generating the augmented reality tour in real-time.

19 Claims, 17 Drawing Sheets

GENERATING AUGMENTED REALITY TOURS

CROSS-REFERENCE TO RELATED APPLICATIONS

This patent application claims priority to provisional patent application 63/340,514 entitled BUILDING AUGMENTED REALITY TOURS WITH TOUR BUILDER NODES AND NODE SEQUENCING, filed on May 11, 2022, naming as the first inventor Luigi Percuoco. This provisional patent is hereby incorporated herein by reference in its entirety.

FIELD

This invention relates to augmented reality systems and devices that provide the user with enhanced human sensorial perceptions using digital content. Various embodiments of the disclosure relate to generating augmented reality tours for viewers. More specifically, various embodiments of the disclosure relate to generating customized augmented reality tours for a visitor to site.

BACKGROUND

An augmented reality application allows a visitor to see a view of a physical world merged with virtual objects in real time. Further, the augmented reality application supplements reality, in the form of a captured image or video stream with additional information. The augmented reality application takes an advantage of a portable electronic device's imaging and display capabilities to combine a video feed with data describing objects in the video feed. In one example, a visitor may use a handheld communication device to capture images and video stream of a view. Further, the video stream and the images may be displayed using the augmented reality application, and additional information of the view is added to the video stream.

However, if the visitor desires to visit a spot, the visitor must switch the augmented reality application, or switch out of an augmented reality view to learn directions to the spot. Thus, the existing augmented reality applications fail to provide proper directions to the visitor. It may happen that the visitor is suggested to go in north direction on a main street to reach to the spot, however, the visitor may not be aware of which direction is north, or street signs might be missing. In this case, it becomes difficult for the visitor to find the directed route. In an embodiment, it may happen that a location of a device, used by the visitor for the augmented reality view, is captured inaccurately, which leads to inaccurate directions to the visitor in the augmented reality application.

This application is related to U.S. patent application Ser. No. 15/991,699, entitled "Augmented Reality Smartglasses for use at Cultural Sites", filed May 29, 2018, and granted on Aug. 10, 2021, as U.S. Pat. No. 11,087,134, the contents of which are hereby incorporated by reference herein in its entirety. Patent document, U.S. Pat. No. 11,087,134 entitled "Augmented Reality Smartglasses for use at Cultural Sites" discloses augmented reality smartglasses for use at cultural sites. In a system as described in the patent document, a user may create a sequence of scenarios for multiple spots of a tour. The sequence of scenarios is further combined to generate the tour. In other words, the user typically manually decides the combination of the scenarios in generating the tour. Further, markers are used to check if the visitor is looking at a particular detail in the scenario. Generally, the marker for each is created by the user using a specific application. The user may manually check if the marker is at a best place so that the visitor will get best view of the spot. Also, the user may track performance of the marker associated with each spot. It is to be noted that the existing methods of generating tours are time-consuming.

In light of the foregoing, there exists a need for a technical and reliable solution that overcomes the above-mentioned problems, challenges, and short-comings, and continues to facilitate an end-to-end process required to generate augmented reality tours for a visitor.

SUMMARY

In one embodiment of the present disclosure, a method for generating an augmented reality tour is provided. The method includes receiving, by a server, information associated with a tour place of an augmented reality tour. In one embodiment, the information associated with the tour place comprises at least one of images of the tour place, videos of the tour place, and spot preferences of a visitor for the augmented reality tour. Subsequently, the method includes selecting, by the server, a set of points of interest associated with the tour place based on the information associated with the tour place. In one embodiment, each point of interest indicates a visiting spot of the tour place. The method further includes generating, by the server, a plurality of nodes associated with each point of interest of the set of points of interest. In one embodiment, the plurality of nodes includes at least one of a menu node, a marker node, a location node, a scene node, a timer node, a full screen video node, an instant tracking node, and a pause node. Finally, the method includes modifying, by the server, a combination of one or more nodes of the plurality of nodes to create tour paths in the augmented reality tour. The modification corresponds to at least one of adding, deleting, and rearranging the one or more nodes, thus, generating the augmented reality tour in real-time.

Additionally, or optionally, the method further includes assigning, by the server, data to each node of the plurality of nodes for transition to a next node from the plurality of nodes of the tour place.

Additionally, or optionally, the method further includes selecting, by the server, a type of augmented reality tour based upon an input from the visitor. In one embodiment, the type of the augmented reality tour is one of a self-guided tour, a Global Positioning System (GPS) tour, and a guided tour.

Additionally, or optionally, the method further includes assigning, by the server, a trigger to each node of the plurality of nodes based on the type of the augmented reality tour. In one embodiment, the trigger indicates an action to be executed at each node of the plurality of nodes.

Additionally, or optionally, the menu node provides a set of action icons associated with the tour paths to the visitor. Each action icon from the set of action icons indicates the next node from the plurality of nodes. The menu node provides an ability to add images to the set of action icons for finding the tour paths, set a default next node with a user-defined timer if no action icon is selected, send text instructions to the visitor via a fully editable text box, and assign a next node for each action icon of the menu node.

Additionally, or optionally, the marker node provides a preview of the images and the videos to the visitor in the augmented reality tour. The marker node provides an ability to provide multiple paths to the visitor via recognition of a set of images of the tour place, set a default next node with a user-defined timer if no image is recognized, and an ability to add and delete images for recognition in the augmented reality tour.

Additionally, or optionally, the location node provides a set of GPS coordinates associated with the visiting spot. The location node provides an ability to set a default next node with a user-defined timer if no GPS or beacons signal is found, send text instructions to the visitor via a fully editable text box, and add and delete the GPS coordinates and the beacon signals that trigger content of the location node.

Additionally, or optionally, the scene node provides an augmented reality-based scenes associated with the visiting spot. The scene node provides an ability to play autonomously without requiring a preceding trigger and assign a next node to start after content in the scene node is complete.

Additionally, or optionally, the timer node displays a notification related to the visiting spot to the visitor. The notification is displayed for a predefined period. The timer node provides an ability to assign a next node to start after the predefined period of the timer node is over.

Additionally, or optionally, the full screen video node displays two dimensional videos associated with the visiting spot to the visitor. The full screen node provides an ability to assign a next node to start after a linked video in the full screen node finishes.

Additionally, or optionally, the instant tracking node allows the visitor to pin a scene associated with the scene node of the visiting spot. The instant tracking node provides an ability to add preview images and videos that appear on screen of a visitor device to guide or orient the visitor and assign a next node to start after the instant tracking node finishes.

Additionally, or optionally, the pause node is configured to temporarily stop display of the information associated with the tour place to the visitor. The pause node provides an ability to assign a next node to start once the visitor device is woken up, and set a default timer and the next node in the augmented reality tour.

In another embodiment of the present disclosure, a system for generating an augmented reality tour is provided. The system includes a visitor device to take an augmented reality tour and a user device to generate the augmented reality tour. The system further includes an application server configured to receive information associated with a tour place of an augmented reality tour. In one embodiment, the information associated with the tour place comprises at least one of images of the tour place, videos of the tour place, and spot preferences of a visitor for the augmented reality tour. Furthermore, the application server is configured to select a set of points of interest associated with the tour place based on the information associated with the tour place. In one embodiment, each point of interest indicates a visiting spot of the tour place. Subsequently, the application server is configured to generate a plurality of nodes associated with each point of interest of the set of points of interest. In one embodiment, the plurality of nodes includes at least one of a menu node, a marker node, a location node, a scene node, a timer node, a full screen video node, an instant tracking node, and a pause node. Finally, the application server is configured to modify a combination of one or more nodes of the plurality of nodes to create tour paths in the augmented reality tour. In one embodiment, the modification corresponds to at least one of adding, deleting, and rearranging the one or more nodes, thus, generating the augmented reality tour in real-time.

In yet another embodiment of the present disclosure, a system for generating augmented reality tours is provided. The system comprises a server for generating the augmented reality tours. The system further comprises an electronic storage, operably coupled to the server, that stores images of a tour place. Further, the system comprises a user interface operable with the server. In an embodiment, a user interacts to generate the augmented reality tours. Furthermore, the system comprises a node generator operable with the server. In an embodiment, the system is configured to identify, using the user interface, the tour place and a type of augmented reality tour. In one embodiment, the type of augmented reality tour is one of a self-guided tour, a Global Positioning System (GPS) tour, and a guided tour. The system is further configured to select, using the user interface, a set of points of interest associated with the tour place. Each point of interest indicates a visiting spot of the tour place. Further, the system is configured to generate, using the node generator, a plurality of nodes associated with each point of interest in the set of points of interest. The plurality of nodes includes at least one of a menu node, a marker node, a location node, a scene node, a timer node, a full screen video node, an instant tracking node, and a pause node. Subsequently, the system is configured to assign a trigger for each generated node of the plurality of nodes. The trigger indicates an action to be executed at each node of the plurality of nodes. Finally, the system is configured to assign data to each node of the plurality of nodes for use with a next node in a sequence of nodes. The plurality of nodes for each point of interest is combined into the sequence of nodes to generate the augmented reality tour.

Various embodiments of the present disclosure provide a method and system for generating an augmented reality tour for a visitor that performs end-to-end administration of the augmented reality tour and all the components of generating the augmented reality tour that is not possible to perform using existing techniques. Further, all the operations of the generation of the augmented reality tour based on arranging multiple nodes in a specific sequence may be easily administered leading to higher efficiency and less time consumption, which the existing technique requires a lot of time.

DETAILED DESCRIPTION

Figure 1:
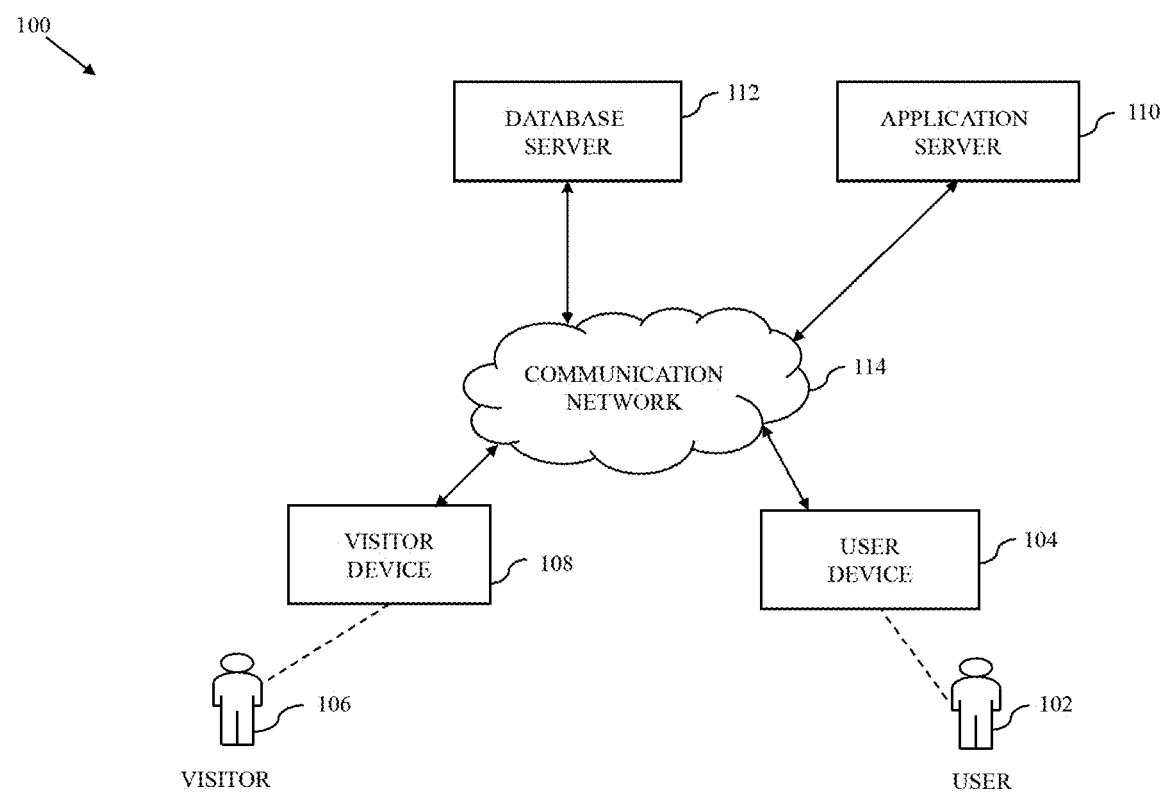
FIG. 1 is a block diagram that illustrates a system architecture of a system for generating an augmented reality tour, in accordance with an embodiment of the disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 is a block diagram that illustrates a system architecture 100 of a system for generating an augmented reality tour, in accordance with an embodiment of the disclosure. The system architecture 100 includes a user 102, a user device 104, a visitor 106, a visitor device 108, an application server 110, a database server 112, and a communication network 114.

In one embodiment, the visitor 106 may include an individual visiting a tour place. The visitor 106 may be referred to as a guest at the tour place. The tour place may be referred to as a spot that is visited by the visitor 106. The visitor 106 visits the tour place using the visitor device 108. In one embodiment, the visitor device 108 is at least one of a wearable device or a handheld device connected via a web application. Examples of the visitor device 108 include, but are not limited to, a personal computer, a laptop, a smartphone, smart glasses, an Augmented Reality (AR) device, a Virtual Reality (VR) device, and a tablet computer. In another embodiment, the visitor device 108 may include suitable logic, circuitry, interfaces, and/or code, executable by the circuitry, that may be configured to perform one or more operations. In an embodiment, the visitor device 108 may be a computing device that is utilized, by the visitor 106, to initiate the one or more operations by means of a service application (associated with the augmented reality tour) running on the visitor device 108. For example, the visitor device 108 may be utilized by the visitor 106, to take the augmented reality tour of the tour place.

Various modes of input that may be utilized by the visitor 106 to perform the aforementioned functions include, but are not limited to, a touch-based input, a text-based input, a voice-based input, keyed input, and a gesture-based input. In one embodiment, multiple visitors may visit the tour place. The multiple visitors may be referred to as a plurality of visitors using a plurality of visitor devices for experiencing the augmented reality tour. Further, data related to each visitor (e.g., a first visitor, a second visitor, . . . , an $n^{th}$ visitor) from the plurality of visitors may be transmitted to the application server 110 using the plurality of visitor devices.

For example, the plurality of visitor devices may be computing devices that are utilized, by the plurality of visitors, to initiate the one or more operations by means of a service application (associated with the augmented reality tour hosted by the application server 110) running on the plurality of visitor devices. Various functionalities and operations of each visitor device of the plurality of visitor devices may be similar to functionalities and operations of the visitor device 108 as described above.

Further, the user 102 may be an individual that generates the augmented reality tour for the visitor 106. The computing device (such as the user device 104) may be utilized by the user 102 for connecting to the application server 110. In one embodiment, the user 102 may be same as the visitor 106 that wants to take the augmented reality tour of the tour place.

The user device 104 may include suitable logic, circuitry, interfaces, and/or code, executable by the circuitry, that may be configured to perform one or more operations. In an exemplary embodiment, the user device 104 may be a computing device, such as a smartphone, a tablet computer, a laptop, smart glasses, or any other portable computing device. The one or more user interfaces may be received in response to an augmented reality tour generation request initiated by the user 102.

In one embodiment, the user 102 may have a user profile on a tour generating platform. The user 102 may access the tour generating platform using the user device 104. The tour generating platform is used to generate the augmented reality tour for the visitor 106. The user 102 is able to access the tour generating platform using unique credentials associated with the tour generating platform. Further, the user 102 may be able to change user profile information, add or update a profile picture, designate a display name, update a registration email, update the profile password, toggle theme colors, toggle content orientation, enable two factor authentication, delete the user profile, and monitor browser sessions by utilizing the user device 104.

The application server 110 may include suitable logic, circuitry, interfaces, and/or code, executable by the circuitry, that may be configured to perform one or more operations for generating the augmented reality tour. The application server 110 may be a computing device, which may include a software framework, that may be configured to create the application server implementation and perform the various operations associated with the generation of the augmented reality tour. The application server 110 may be realized through various web-based technologies, such as, but not limited to, a Node JS framework, a Java web-framework, a .NET framework, a PHP framework, a python framework, or any other web-application framework. Examples of the application server 110 include, but are not limited to, a personal computer, a laptop, a desk top computer, a cloud computer, or a network of computer systems. In one embodiment, the application server 110 is implemented as multiple instances of the application server 110 for the plurality of visitors 106a-106n and scalable as per requirement.

In an embodiment, the application server 110 may be configured to process, control, and manage various functionalities and operations such as authenticating credentials, selecting points of interest, generating nodes, modifying combination of nodes, and generating the augmented reality tour. For example, the application server 110 may be configured to receive credentials, from the user 102, associated with the tour generating platform. The credentials may include, but are not limited to, a contact number, a login identifier (ID), an email identifier (ID), and a password associated with the tour generating platform. The application server 110 may further authenticate the credentials to generate the augmented reality tour. Upon authentication, the application server 110 may receive information associated with the augmented reality tour. The information includes at least one of images of the tour place, videos of the tour place, spot preferences of the visitor 106, and the like. Upon receiving the information, the application server 110 may select a type of the augmented reality tour based on an input from the visitor 106. The type of the augmented reality tour is at least one of a self-guided tour, a Global Positioning System (GPS) tour, and a guided tour.

Further, the application server 110 may select a set of points of interest associated with the tour place based on the information associated with the tour place. Each point of interest indicates a visiting spot of the tour place. Further, the application server 110 may generate a plurality of nodes associated with each point of interest of the set of points of interest. The plurality of nodes includes at least one of a menu node, a marker node, a location node, a scene node, a timer node, a full screen video node, an instant tracking node, and a pause node. The application server 110 may assign data to each node of the plurality of nodes for transition to a next node from the plurality of nodes of the tour place. Finally, the application server 110 may modify a combination of one or more nodes of the plurality of nodes to create tour paths in the augmented reality tour. The modification corresponds to at least one of adding, deleting, and rearranging the one or more nodes, thus, generating the augmented reality tour in real-time.

The database server 112 may include suitable logic, circuitry, interfaces, and/or code, executable by the circuitry, that may be configured to perform one or more operations, such as receiving, storing, processing, and transmitting queries, data, or content. The database server 112 may be a data management and storage computing device that is communicatively coupled to the application server 110 to perform the one or more operations. In an exemplary embodiment, the database server 112 may be configured to manage and store training data comprising information of historical augmented reality tours associated with the tour place. The database server 112 may be configured to receive the training data from the application server 110.

The database server 112 may be further configured to manage and store information (e.g., visitor information) associated with the visitor the visitor 106. The information of the visitor 106 may include at least demographic information, visiting preferences, historical tour places, and the like. The information of the visitor may further include a type of the visitor device 108. In an embodiment, the database server 112 may be configured to generate a data structure including one or more rows and columns for storing the information of the visitor 106.

In an embodiment, the database server 112 may be configured to receive a query from the application server 110. The query may correspond to an encrypted message that is decoded by the database server 112 to determine a request for retrieving requisite information (such as the visitor information, the training data, or any combination thereof). In response to the determined request, the database server 112 may be configured to retrieve and communicate the requested information to the application server 110. Examples of the database server 112 may include, but are not limited to, a personal computer, a laptop, or a network of computer systems.

In one embodiment, the database server 112 may be configured to store user information associated with multiple users. The user information may correspond to a user profile, of the multiple users, related to the tour generating platform. The user information may include credentials of the user profile, demographics information of the user 102, tours associated with the user profile, and the like. The database server 112 may manage and store the user information. In one embodiment, the database server 112 may be referred to as an electronic storage.

In operation, the application server 110 receives credentials associated with the tour generating platform. The credentials are received from the user 102 who is generating the augmented reality tour. The credentials include at least one of a contact number, an email identifier (ID), a login identifier (ID), and a password. In one embodiment, the user 102 is having a user profile on the tour generating platform. The credentials help the user 102 to access the tour generating platform. The credentials are unique to each user from multiple users having access to the tour generating platform.

Once the credentials are received, the application server 110 verifies the credentials using the user information stored in the database server 112. In one embodiment, upon receiving the credentials from the user 102, the credentials are verified with the credentials stored in the database server 112. If the credentials received from the user 102 are correct, the application server 110 authenticates the credentials to generate the augmented reality tour on the tour generating platform. Upon authentication, the user 102 is logged in on the tour generating platform. Further, the user 102 is able to generate, modify or delete the augmented reality tour on the tour generating platform.

After logging-in on the tour generating platform, the user 102 may have access to a main screen of the tour generating platform. The main screen comprises main navigation buttons and multiple tours on which the user 102 is working. In one embodiment, the main screen comprises a section bar on a left side with multiple buttons linking to each section, and a detailed dashboard for each section appears in a center of the main screen. Further, details of the user profile, team notifications, and language toggle options appear on a top right of the main screen. The sections on the main screen include at least one of a tours section, an assets section, a team section, a devices section, and an analytics section.

Figure 3A:
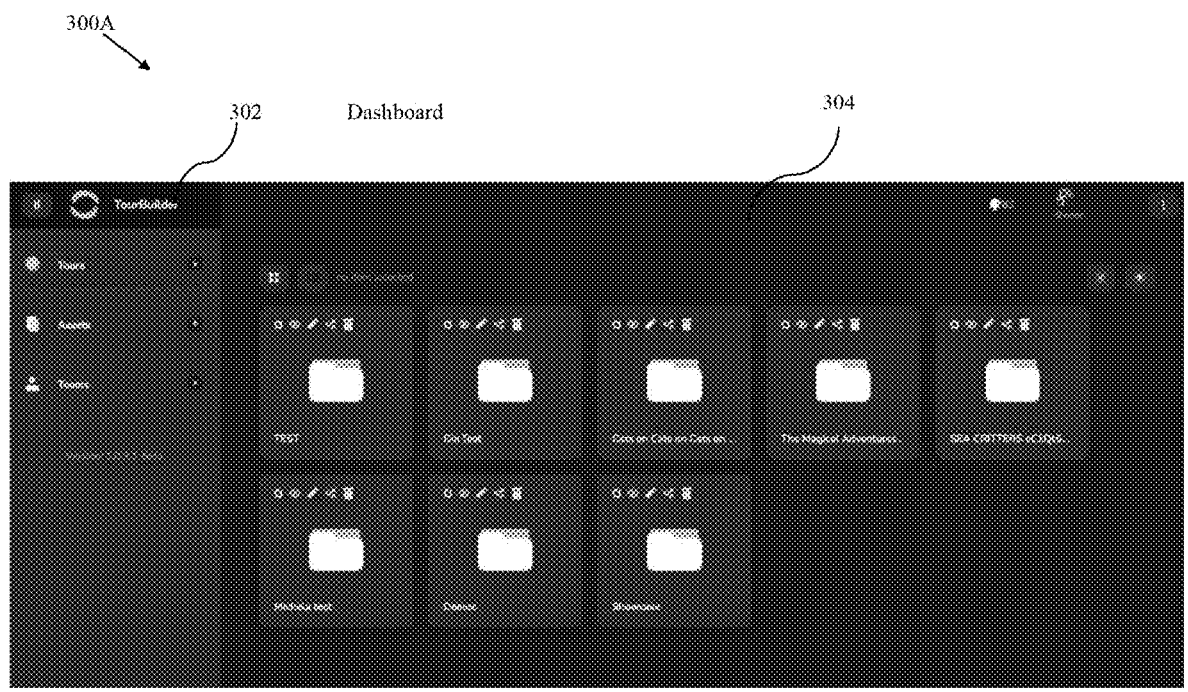
FIGS. 3A-3H, collectively, represent a tour generating platform, in accordance with an embodiment of the disclosure.

Referring to FIGS. 3A-3H, collectively, represent a tour generating platform, in accordance with an embodiment of the disclosure. Referring to FIG. 3A, an embodiment of a dashboard 300A is shown, in accordance with an embodiment of the present subject matter. The dashboard 300 may comprise a menu 302 on a left side and multiple folders 304 on right side of a main screen. The menu 302 may comprise tours, assets, and a team's section.

Figure 3B:
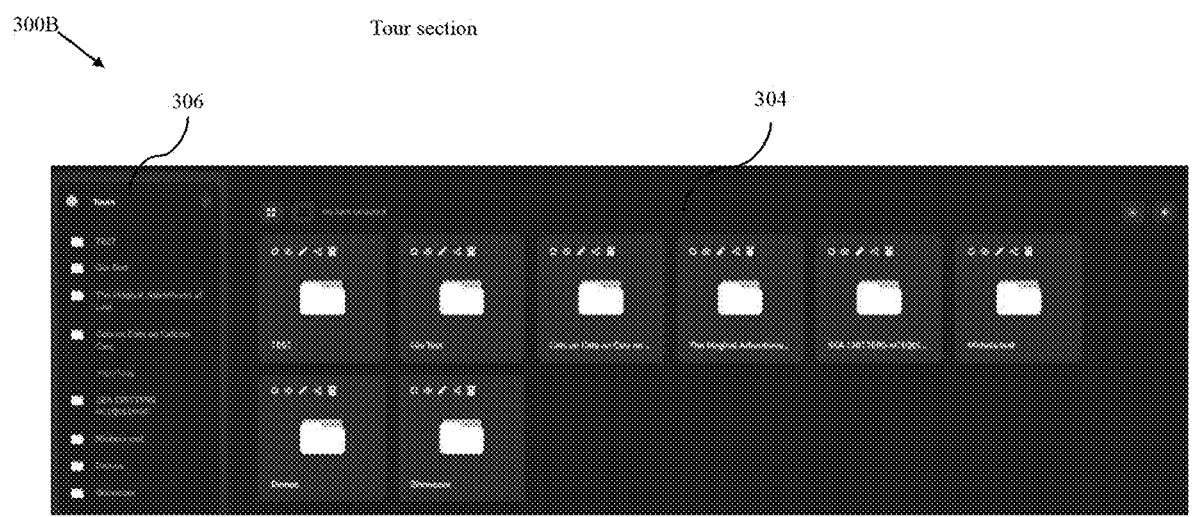

Referring now to FIG. 3B, an embodiment of the tour section 300B is explained, in accordance with an embodiment of the present subject matter. In one embodiment, the tours section includes all the tours that are accessible to the user 102. The tours 306 may be assigned to distinct folders 304 to facilitate file sharing and retrieval with different access permissions adjusted for different users in a team. The folders 304 may be displayed in either a list or a grid orientation via a toggle icon. In one embodiment, when the user 102 clicks on a folder 304, all the subfolders may be shown until a leaf folder is reached. Further, when the user 102 clicks on the leaf folder, multiple tours within the leaf folder may be shown in a desktop section. Furthermore, the users may organize folders 304 by inserting additional subfolders within the folders 304. In an embodiment, when the user 102 clicks the folder, the user 102 may be either taken to the additional subfolders or the tours based on a user preference. Further, the user 102 may be able to access the folders 304 and the subfolders by either clicking on respective icons in the center of the main screen or clicking on names of the folder on a left side menu.

Figure 3C:
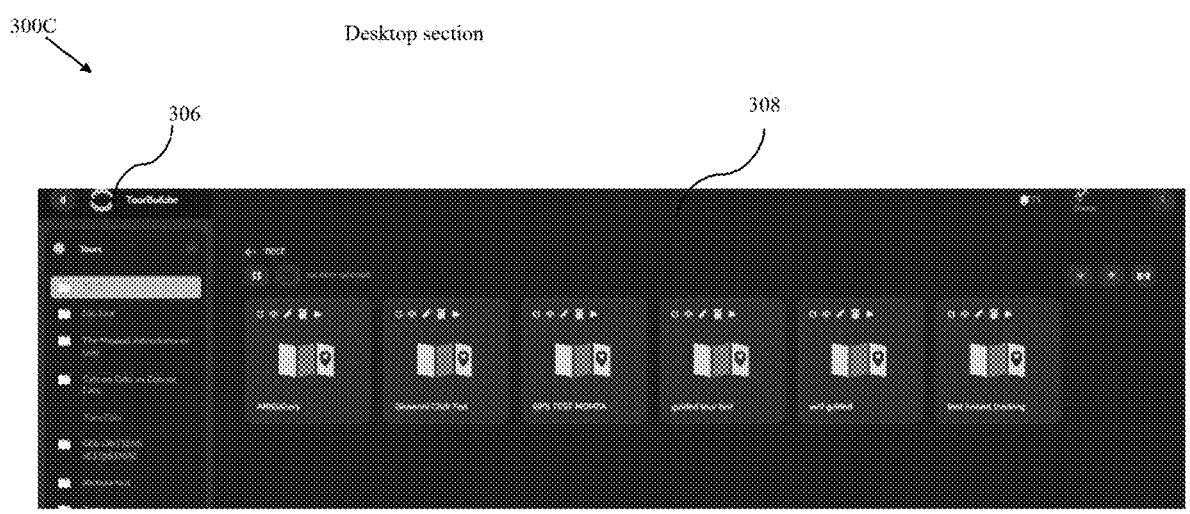

Referring now to FIG. 3C, an embodiment of the desktop section 300C is illustrated in accordance with an embodiment of the present subject matter. In the desktop section, the user 102 is able to add, publish, clone, or delete any tour from the multiple tours 306 on which the user 102 is working. Further, the tour folders 308 are related to the multiple tours 306. In an embodiment, publishing of tour makes the tour available to the visitor 106 (e.g., via an internet) based on settings in the devices section. An export and an import of tours is provided for through an interfacing of the tour generating platform with external systems. In an embodiment, the tour may be imported or exported in an extensible markup language (XML) format. Further, the cloning of the tour helps to generate the tour in multiple languages. The deletion of the tour includes removing the tour from the desktop section of the user device 104.

Figure 3D:
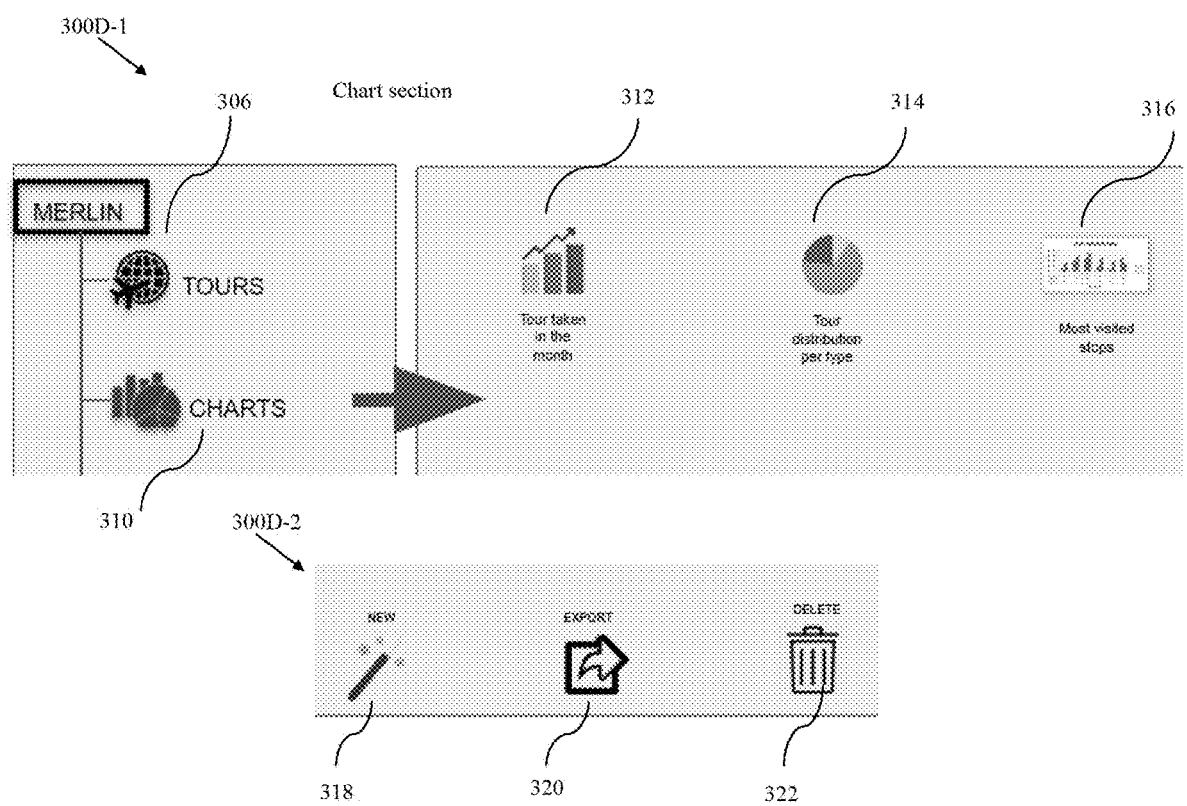

Referring now to FIG. 3D, an embodiment of a chart section 300D-1 and 300D-2 is illustrated, in accordance with an embodiment of the present subject matter. In one embodiment, the chart section may be present on the main screen of the user device 104. When the user 102 clicks on the chart section, multiple charts 310 that belong to the user's domain (e.g., a team) may be displayed in the desktop section. Further, the analytics section allows the user 102 to generate different reports based on a performance of the visitors 106. The performance of the visitors 106 includes the tours 306 taken by the visitors 106 in a month 312, tour distribution type 314, and most visited spots 316 of the visitors 106 in the past. In one embodiment, the charts 310 may be newly added 318, exported 320 or deleted 322 using the desktop section.

Figure 3E:
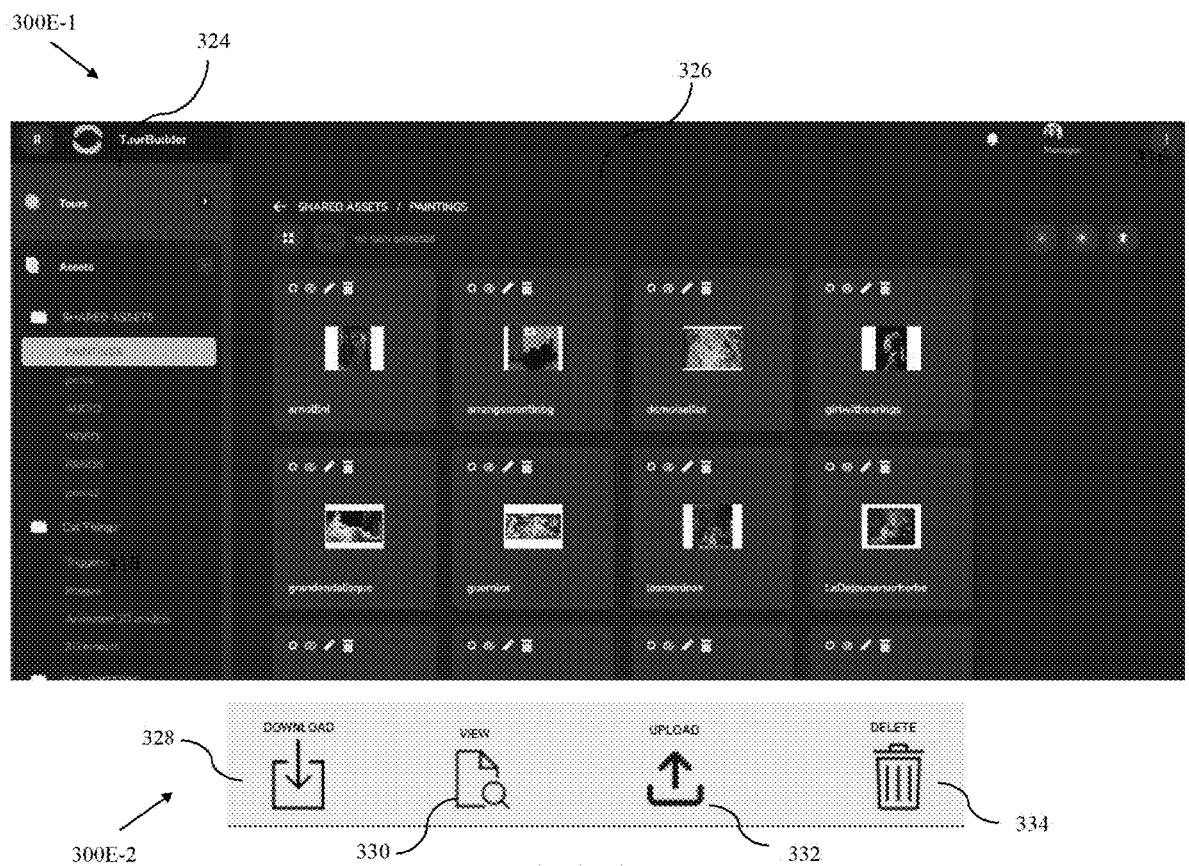

Referring now to FIG. 3E, an embodiment of the assets section 300E-1 and 300E-2 is illustrated, in accordance with an embodiment of the present invention. The assets section includes multiple assets 324 that are accessible by the user 102. The assets section may be organized in the folders 326 by a team leader to facilitate files sharing and retrieval from all the team members. In one embodiment, when the user 102 clicks on a folder, all the subfolders may be shown until a leaf folder is reached. When the user 102 clicks on the leaf folder, all the assets 324 within the leaf folder may be shown in the desktop section. The assets list may be organized per file type (e.g., Three-Dimensional (3D) model, Two-Dimensional (2D) image, a full screen video, an audio, and the like). Further, additional information such as a file name, a file description, a last update, and information corresponding to updating of the file may be displayed to the user 102. The user 102 is able to download 328, view 330, upload 332, rename, or delete 334 the files. In one embodiment, the upload feature helps to upload files of any size. The assets 324 are uploaded based on a content type. Multiple files in the same category may be bulk uploaded together. Further, the files may be dragged and dropped directly from a computer or uploaded from a file explorer or its equivalent. In one embodiment, the file types and formats include Two-Dimensional (2D) images (e.g., PNG or JPEG), panorama images (e.g., PNG or JPEG, with Dimensions: Equirectangular like 2048×1024), a Two-Dimensional video (e.g., MP4), a panorama video (e.g., MP4 with Dimensions: Equirectangular like 2048×1024), an Audio (MP3), a 3D Models such as Animated: FBX+STL+PNG texture, or Stationary: OBJ+MTIL+PNG texture).

Figure 3F:
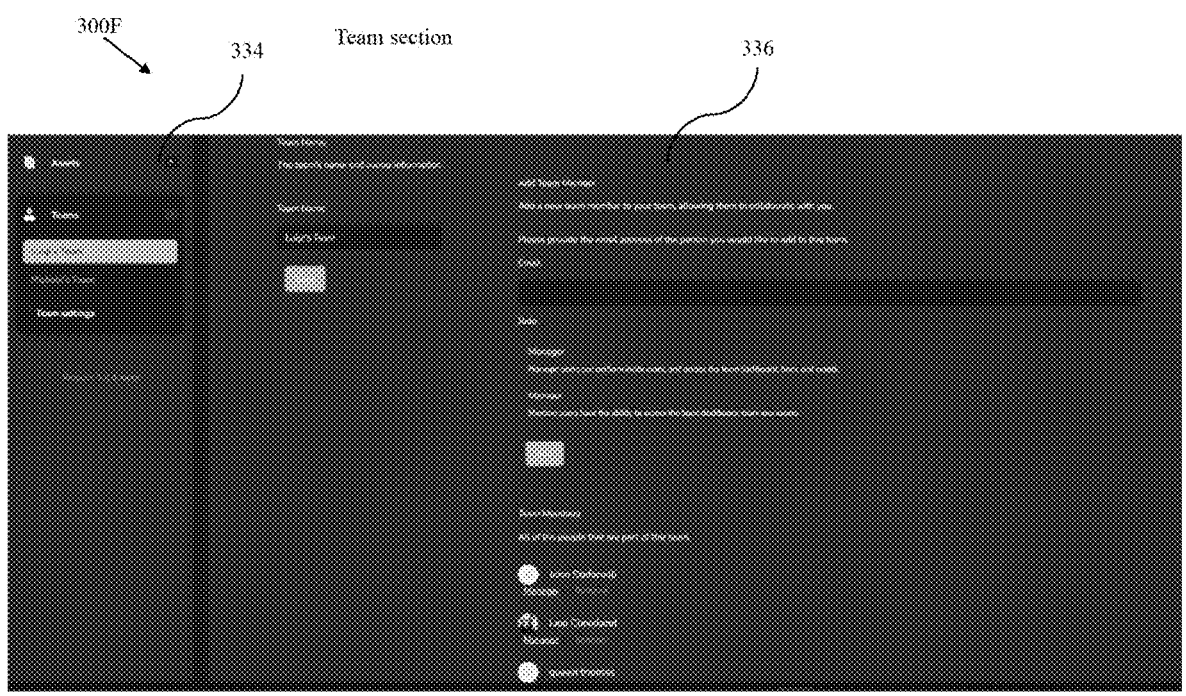

Referring now to FIG. 3F, an embodiment of the team section 300F is illustrated, in accordance with an embodiment of the present subject matter. In an embodiment, if the user 102 is a team leader, a team icon 334 may appear in the file system. When the team leader clicks on a team member, all the authorizations for the team member may appear on a screen 336 in the desktop section. Each team member may have a read access, a write access, or no access for folders, charts, or devices. The team leader may be able to add or delete the team members from the team.

Figure 3G:
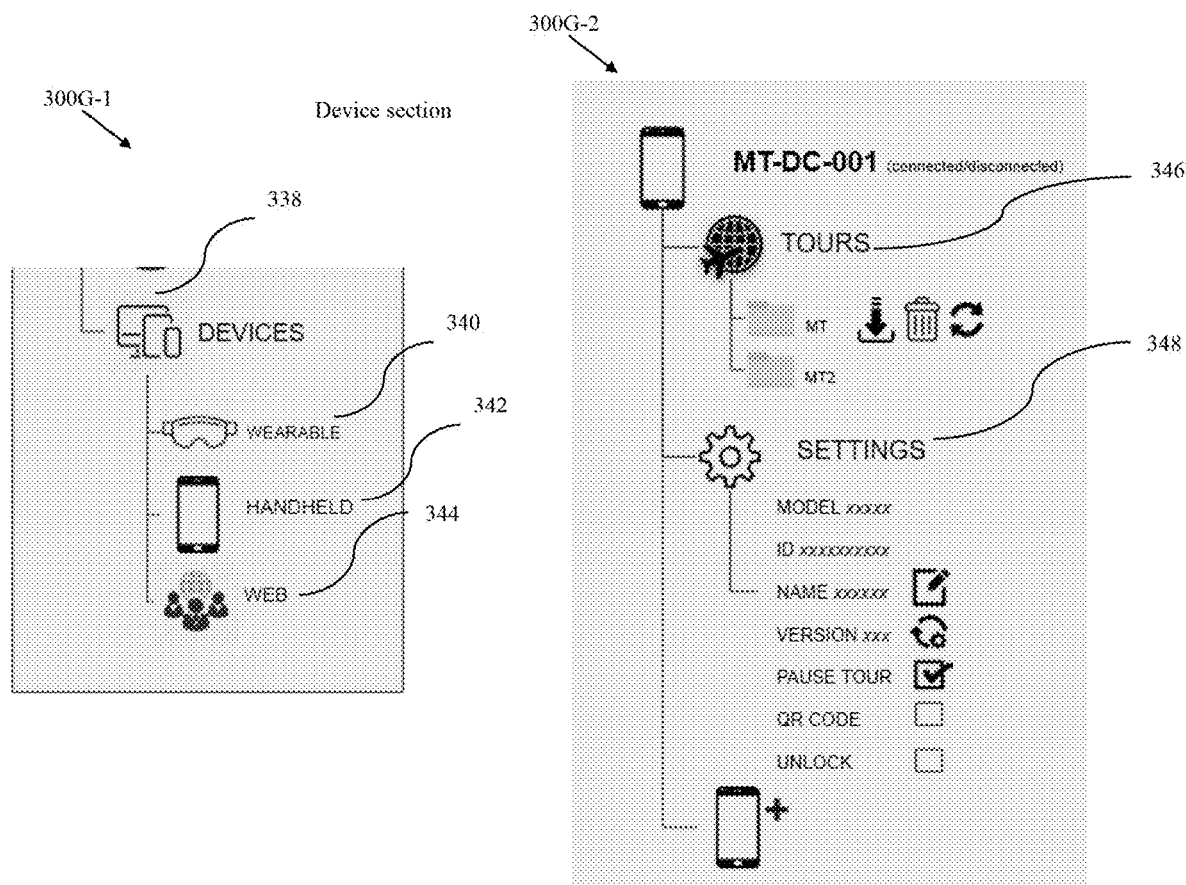

Referring now to FIG. 3G, an embodiment of the devices section 300G-1 and 300G-2 are illustrated, in accordance with an embodiment of the present subject matter. The devices section may comprise devices 338. The devices 338 may include, for example, wearable devices 340, handheld devices 342 or end user devices 344 connected via wirelessly, for example, through a web application. When the user 102 clicks on a category, all the devices 338 associated with that category may be shown in the desktop section. When the user 102 clicks on a specific device, two icons may appear e.g., the tour 346 installed on the device and the device's settings 348. In one embodiment, a new tour may be downloaded into the device using the icon. If a new version of the tour is available, then an update icon may be shown next to the device. Further, the tour might be deleted from the user device using an icon.

Further, a new device may be added to the devices section using a new device icon. Further, the device 338 may be upgraded to a newest software version using an upgrade icon. Based on a device model, defined settings may be available, for example with Epson Moverio bt350, icons like power, back, pause or a QR code detector may be customized. The user 102 may be able to enable or disable the settings using the icons. In one embodiment, the devices 388 include iPhone and android phones or tablets. The user 102 may be able to enable a kiosk mode on the tablets to prevent the user 102 from exiting the tour generating platform.

Figure 3H:
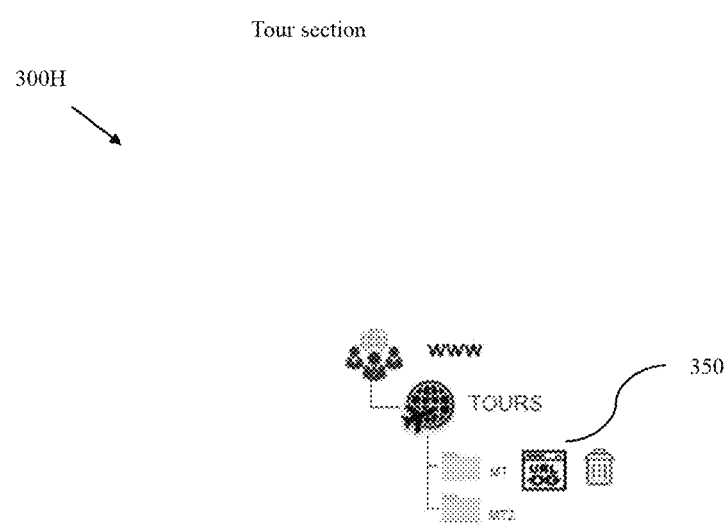

Referring now to FIG. 3H, publishing of the augmented reality tour 300H is illustrated, in accordance with an embodiment of the present subject matter. In an embodiment, a tour icon 350 may be available indicating the tours that might be visible over the internet at a specific Uniform Resource Locator (URL).

Referring again to FIG. 1, in one embodiment, in the user profile, the user 102 may be able to change user profile information, add or update a profile picture, designate a display name, update a user registration email, update a user password, toggle theme colors, toggle content orientation, enable two factor authentication, delete the user profile, and monitor browser sessions. In one embodiment, the tour generating platform is a co-working environment. Further, notifications related to changes made by the multiple users in the augmented reality tour may be displayed to the user 102 by utilizing the user device 104.

Further, upon authentication of the credentials, the application server 110 is configured to receive information associated with the tour place. The information associated with the tour place comprises at least one of images of the tour place, videos of the tour place, and spot preferences of the visitor. The images of the tour place may include at least one of Two-Dimensional (2D) images (e.g., PNG or JPEG), panorama images (e.g., PNG or JPEG, a Three-Dimensional (3D) image, and the like). The videos of the tour place may include at least one of a Two-Dimensional (2D) video (e.g., MP4), a panorama video (e.g., MP4), and the like. Further, the spot preferences of the visitor correspond to a plurality of visiting spots that the visitor 106 wants to visit in the augmented reality tour. In other words, the images and the videos are associated with a plurality of visiting spots corresponding to the tour place.

In one embodiment, the information may be prestored in the user device 104. The information of the tour place may be stored in the database server 112. The user 102 may upload the information on the tour generating platform to generate the augmented reality tour. In another embodiment, the user 102 receives the information from multiple sources like historical tours data, the internet, social media platforms, and the like. In one embodiment, the information comprises a set of images captured by a camera. The images may be further reprocessed through blurring, a crop of central area, and then resized based on a resolution according to a predefined threshold.

In one embodiment, the augmented reality tour generated using the tour generating platform is represented by a graph structure (e.g., a tour graph). The graph structure is made up of two types of fundamental substructures: the nodes and a link. The node comprises information associate with the visiting spot of the augmented reality tour. Further, the link establishes a connection between two nodes and therefore between the two visiting spots of the augmented reality tour. In an embodiment, one or more oriented links are used to connect a child node to a parent node of the augmented reality tour. In one embodiment, the augmented reality tour, generated using the tour generating platform, comprises a single root node that represents a starting point of the augmented reality tour. Other nodes may be linked to the root node and to each other.

Upon receiving the information, the application server 110 selects a type of the augmented reality tour based upon an input from the visitor 106. The type of the augmented reality tour is one of a self-guided tour, a Global Positioning System (GPS) tour, and a guided tour. In one embodiment, the GPS tour is an outdoor tour in which the visitor 106 has a digital map with georeferenced points of interest. The GPS tour type may be performed with physical and digital beacons for indoor and outdoor tours. In an embodiment, the guided tour is a group tour lead by a tour guide controlling a fleet of hardware via a transmitter loaded with the Art Glass or similar assistant app to wirelessly synchronize content across multiple devices. In one embodiment, the GPS tour and the guided tours are non-linear tours by default as content is triggered based on a location of the visitor 106 or the beacon selected by the tour guide.

Further, the self-guided tour may be a linear tour, with a rigid succession of the various stages with sequential storytelling or a nonlinear tour. The self-guided tour may include multiple stories related to the visiting spots that may be developed in different ways depending on the choices of the visitor 106. In one embodiment, for the self-guided tour, a wizard function sets a number of options for each trigger to produce the linear tour. The user 102 may add options to the trigger with a tour editor application generating the nonlinear tour. In the non-linear tour, the visitor 106 might be able to choose multiple spots and generate multiple stories and pathways. Once the tour type is selected, the application server 110 may allow the user 102 to assign a name to the augmented reality tour.

The application server 110 further selects a set of points of interest associated with the tour place based on the information associated with the tour place. In one embodiment, the application server 110 analyzes the information, e.g., the spot preferences of the visitor, to select the set of points of interest. Each point of interest indicates a visiting spot of the tour place. In one example, assume 12 visiting spots are present at the tour place. Further, 8 spot preferences are received as the information. Based on the preferences, the application server 110 selects 8 spot preferences as the visiting spots for the visitor 106 in the augmented reality tour.

Once the point of interest is selected, the application server 110 generates a plurality of nodes associated with each point of interest of the set of points of interest. The plurality of nodes includes for example one of more of a menu node, a marker node, a location node, a scene node, a timer node, a full screen video node, an instant tracking node, and a pause node.

In one embodiment, the menu node provides a set of action icons associated with tour paths to the visitor 106. Each action icon from the set of action icons indicates a next node from the plurality of nodes. The set of action icons are customizable and text corresponding to each action icon is editable. In one embodiment, the menu node provides a menu or different options to the user 102 for generating the augmented reality tour. The menu node further provides an ability to toggle a language of menu text that may appear to the visitor 106. The menu node further provides an ability to edit the name of the menu node for easy identification of the visitor 106. Further, the menu node provides an ability to set a "default" next node with a user-defined timer if no action icon is selected. The menu node further provides an ability to toggle stereoscopic vision (e.g., Three-Dimensional vision) ON and OFF for content of the menu node. The menu node further provides an ability to give text instructions to the visitor 106 via a fully editable text box. The menu node further provides an ability to add images to the set of action icons for finding the tour paths, decoration, and to depict visual options. The menu node further provides an ability to add and delete one or more action icons from the set of action icons. Further, the menu node provides an ability to assign a next node for each action icon of the menu node, when used in combination with other nodes. The assigning of the next node may be used to create experiences such as a personalized experience, multiple-choice quizzes, timed multiple-choice quizzes, a self-selected experience, and the like.

In one embodiment, the menu node is used to provide options to the visitor 106. Based on the option chosen by the visitor, a specific branch of the augmented reality tour is activated. The choice is made through the action icons that are projected onto the user device 104.

The menu node comprises characteristics, such as, a name that is used as a description and allows the visitor 106 to clearly identify the menu node in the tour graph. The next default node, this option allows the system to force the choice on the visitor 106 within a time limit, beyond the time limit the default choice is activated. The function of the default choice is to not block the visitor 106 indefinitely. The function of the default choice is also to provide additional instructions if the choice is not made within a maximum established time.

In an embodiment, the next node may be a node with more detailed instructions that then refers back to the parent node (e.g., the timer node). In another embodiment, the next node may be a branch of the augmented reality tour with a complex set of information and possible actions. The menu node is configured to provide instructions associated with the choices. For example, "choose one of the following options to continue the tour" or the quizzes may be generated "tell me the name of the character . . . .". The menu node provides a list of options. Each option comprises information such as—an option name, that appears as menu choice text, a digital asset, that is used as a graphic for the action icons, and the next node corresponding to the choice made by the visitor 106.

In one exemplary embodiment, the visitor 106 may have a personalized experience in the augmented reality tour. The augmented reality tour is generated based on combining a series of menu nodes and scene nodes to lead the visitor 106 down a linear path. The linear path branches based on the spot preferences of the visitor 106. In one example, assuming the visitor 106 at a museum dedicated to a famous poet, the visitor 106 may be encouraged to "think like a writer" as the visitor 106 stands in a courtyard. Further, the menu node is presented to the visitor 106 asking where the visitor 106 would like to write. Furthermore, selection of place of writing may take the visitor 106 to different paths of interconnected menu nodes and scene nodes. Further, as the visitor 106 continues to answer questions in the menu nodes, the application server 110 generates a tailored "writer's persona" that the visitor 106 wishes to embody during the augmented reality tour.

In another exemplary embodiment, for the multiple-choice quizzes experience, the user 102 of the tour generating platform may insert multiple icons to the menu node and assign the next nodes for each selection. The next nodes indicate a transition to any type of node. In one example, the visitor 106 may be taking the augmented reality tour at an art museum. A video may be displayed to the visitor 106 in the full screen node that depicts a painting that is obscured as a silhouette. After the video ends, the menu node with pictures of multiple painting may appear on the screen of the visitor device 108. Further, the visitor 106 is asked to identify which painting they think they saw in the video. The menu node may display multiple painting options to the visitor 106 and ask the visitor 106 to choose one painting that the visitor 106 saw in the video. In one embodiment, if the visitor 106 selects a wrong answer, the visitor 106 may be taken to a scene node. The scene node informs the visitor 106 that the answer is wrong. Further, the scene node is transitioned back to the menu node. The menu node further provides an opportunity to the visitor 106 to again identify the correct painting. In another embodiment, if the visitor 106 selects a correct answer that means the correct painting, the visitor 106 may be taken to a scene node containing layered information that talks about the correct painting. In other words, information related to the painting may be displayed to the visitor 106 in the scene node. Further, a marker node appears, and encourages the visitor 106 to locate the real painting in a gallery.

In yet another exemplary embodiment, for the timed multiple choice quizzes experience, the user 102 may be able to limit an amount of time the visitor 106 has to respond to a prompt or a notification by assigning a default next node and setting a default timeout. The quizzes become challenging for the visitor 106 due to the addition of a time limit to respond. In the embodiment, the visitor may 106 have to replay content from a previous node, move the experience along to prevent waiting. Further, the quizzes may be linked with another node that provides additional hints to the visitor 106.

In yet another embodiment, a menu may be generated that allows the visitor 106 to choose the content that they want to experience during the augmented reality tour. In one example, the user 102 may be presented with the full selection of augmented scenes. The user 102 may be able to select and reselect the augmented scenes from one or more centralized screens in a desired order based on the visitor inputs. Based on the selection, the visitor 106 may have the self-selected experience in the augmented reality tour.

In one embodiment, the marker node provides a preview of the images and the videos to the visitor 106 in the augmented reality tour. The images and videos are used as triggers for the marker node. The images and videos are grouped together in the marker node. Further, the marker node may provide multiple paths to the visitor 106 via recognition of a set of images of the tour place. The set of images in the marker node comprise images of multiple different objects and locations of the tour place. In one embodiment, the marker node provides an ability to toggle a language of text of the marker node. The marker node further provides an ability to change name of the marker node for easy identification of the visitor 106. The marker node provides an ability to set a "default" next node with a user-defined timer if no image is recognized. The marker node provides an ability to toggle stereoscopic vision ON and OFF for content of the marker node. The marker node further provides an ability to give text instructions to the visitor 106 via a fully editable text box. Further, the marker node provides an ability to add preview images and videos that appear on screen of the visitor device 108 to guide the visitor 106 during the augmented reality tour. The marker node further provides an ability to add and delete images for recognition as needed in the augmented reality tour. Further, the marker node provides an ability to assign a next node for recognized images in the marker nodes. The marker node may be used in combination with other nodes to create different experiences for the visitor 106.

In one embodiment, the marker node comprises a list of reference images to which the link to the next node is attached. The list of reference images is used to display the scene node corresponding to what the visitor 106 is looking at in the augmented reality tour. The marker node comprises characteristics such as—a name that allows for easy identification in the tour graph. The marker node comprises instructions in the form of text that is projected onto the visitor device 108. In some embodiments, the marker node comprises instructions in the form of a video or preview image that is projected, combined with previous text, on the visitor device 108. The marker node is used to assign a next default node if the visitor 106 does not view any of the images provided within a set time limit. The marker node comprises a list of references that a camera of the visitor device 108 must recognize. Each reference is represented by a name, an image to recognize, a real mode dimensions corresponding to the image, and a next matching node. In one embodiment, the real mode dimensions are used by a visual recognition algorithm to improve identification redemption or recovery.

In an embodiment, the marker node comprises the instructions related to what the visitor 106 may look at to activate the digital content. The visitor 106 may be in the real world that is more complex and unpredictable than the virtual world. The provision of clear instructions is essential to prevent the visitor 106 from getting lost or unable to find the visiting spot. The combination of preview text, images, and videos, combined with the possibility of having a timed default node, allows the user to activate a series of actions to support the visitor 106. In an example, triggering help by transferring the visitor 106 to a branch of the augmented reality tour dedicated to resolution of issues.

In one exemplary embodiment, for a visual scavenger hunt experience, the user 102 may add nodes that give hints or instructions to locate certain objects or places in the augmented reality tour. Further, linked content may start once the visitor 106 makes visual contact with an image from the set of images of the marker node. For example, a video about a piece of art in a gallery may be displayed to the visitor 106, and the visitor 106 may be instructed to go find the piece of art. Once the visitor 106 locates the piece of art in the gallery in the marker node, the next node triggers as a scene node. In the scene node, an interactive three-dimensional model of the art piece appears on the visitor device 108.

In another exemplary embodiment, for a linear tour experience, the user 102 may be able to control the path to be taken by the visitor 106. The user may use the marker nodes to trigger scenes in the augmented reality tour. Further, the user 102 ensures that the visitor 106 may not progress in the augmented reality tour unless the visitor 106 looks at a specified object and stays on a path of the augmented reality tour. In yet another embodiment, the visitor 106 may be allowed to roam at the tour place by putting multiple markers in a single marker node that may be triggered in a random order. The random roaming tour of the visitor 106 may be referred to as the non-linear tour.

In one embodiment, the location node provides a set of Global Positioning System (GPS) coordinates associated with the visiting spot. The location node may further provide multiple paths to the visitor 106 via the set of GPS coordinates or signals from digital or physical beacons. Virtual beacons may be generated directly within the location node. Further, the location node provides an ability to toggle a language of text of the location node. The location node further provides an ability to change name of the location node for easy identification. Further, the location node provides an ability to set a "default" next node with a user-defined timer if no GPS or beacons signal is found. Furthermore, the location node provides an ability to toggle stereoscopic vision ON and OFF for content of the location node. The location node further provides an ability to give text instructions to the visitor 106 via a fully editable text box. The location node provides an ability to add preview images and videos that appear on screen of the visitor device 108 to guide the visitor 106. The location node further provides an ability to add and delete the GPS coordinates and the beacon signals that trigger content. The location node further provides an ability to label GPS triggers and the beacons for easy identification. The location node further provides an ability to add GPS coordinates (e.g., longitude and latitude), and range for controlling trigger of content of the location node. The location node further provides an ability to add a Universally Unique Identifier (UUID) of the physical beacon and adjust the range to control the triggers. The location node provides an ability to generate the digital beacon and adjust the range to control the triggers. The location node provides an ability to assign a next node for the GPS coordinates and the beacon signals.

In one embodiment, the location node comprises a list of GPS coordinates or beacon signals that activate the corresponding scene node for that physical location. The GPS coordinates and the beacon signals may coexist at same time. The location node provides a name that is used to identify the node within the tour graph. The location node provides a next default node that is activated if the visitor device 108 does not detect any signal within a time limit. The location node comprises instructions in text form, video or image form and the like. In an embodiment, the location node comprises a list of coordinates. The list of coordinates may reside in the same node simultaneously. In an example, the location node may help to manage museum itineraries in which the visitor 106 passes from internal to external areas. The GPS signal works in the external areas and may be combined with the beacon signal for internal areas.

The GPS coordinates provide a latitude and a longitude. The GPS coordinates further provide a tolerance distance from the GPS position (e.g., latitude and longitude). The tolerance distance indicates a range to activate the next node. When the coordinates of the visitor device 108 fall within the range, the next node is activated.

Further, the beacon signals provide a beacon code that may have structure compatible with two supported standards. In some embodiments, the application server 110 provides the ability to automatically generate a unique beacon code that is used for creating guided tours. The beacon signals provide a tolerance distance from the location of the beacon to be considered. The tolerance distance indicates a range to activate the next node. When the coordinates of the visitor device 108 fall within the range, the next node is activated. The tolerance distance is calculated based on detected strength of the beacon signal. The detected strength is very often inconsistent as the strength of the beacon signal is influenced by numerous signals present in an environment.

In one exemplary embodiment, assume use of the location node in a GPS mode to limit a trigger area, and get more specific with the marker nodes. The location node may be used with the marker node for a scavenger hunt crossing several neighborhoods. In another exemplary embodiment, the location node may be used with any node and the pause node for the guided tour. The guide operated tour gets triggered via the location node paired with the pause nodes after each scene node to conserve battery while the visitor 106 walks or talks during the augmented reality tour. In yet another exemplary embodiment, the location node may be used with the scene node for a live music experience. A centralized guide operated location node holds the virtual beacons that trigger song specific to the scene nodes.

In one embodiment, the scene node provides an augmented reality-based scenes associated with the visiting spot to the visitor 106 during the augmented reality tour. The scene node comprises complex and layered augmented reality scenes of the tour place. The scene node may be linked to other nodes externally through a "next node" feature or internally via an animation editor. The animation editor is a content arrangement tool that may be used to create complex and interactive scenes within the scene node. Further, the scene node provides an ability to toggle language of text that appears on the scene node. The scene node further provides an ability to name the scene node for easy identification. The scene node further provides an ability to play autonomously without requiring a preceding trigger. The scene node further provides an ability to toggle stereoscopic vision ON and OFF for content of the scene node. Further, the scene node provides an ability to give text instructions to the visitor 106 via a fully editable text box. The scene node further provides an ability to assign the next node to start after content in the scene node is complete. The scene node further provides an ability to assign multiple next nodes based on content.

In one embodiment, the scene node may comprise digital assets for narration of a specific visiting spot on the augmented reality tour. The scene node may provide textual instructions to the visitor 106 that are displayed throughout a playback of the scene. In one example, objects in three-dimensional scenes may be placed outside the visitor's field of view (e.g. behind the visitor 106). Further, the textual instructions may instruct the visitor to look around to view the objects. The scene node may further provide the next node to display when the scene ends or when the visitor 106 takes an action as indicated in an animation editor. The scene node may display the scene content such as the objects and the related animations.

In an embodiment, an object in a scene may be an audio file, an image, a video, a three-dimensional model, a 360 panoramic image, a 360 panoramic video, and the like. Further, multiple objects of any type may be placed in the scene. The objects may be placed at a position in three-dimensional space in terms of distance from the visitor 106 on the x, y, z axes. The objects may be placed at a scale with respect to an original object in the three axes x, y, z. The objects may be placed in rotation (on itself) on the three axes x, y, z. The objects may have the characteristic of a level of transparency. Further, the characteristic of the objects may comprise an action to perform upon touching an object with a click. The action includes hide, show, go to the next scene, playback (in the case of video/audio/animated three-dimensional model) or perform a custom action created with the animation editor. The characteristic of the objects includes an option whether to anchor the object on the screen while the visitor device 108 is moving, that allows the visitor 106 to have the object always present on the screen.

In an embodiment, a custom action is an animation created with the animation editor. The animation may comprise characteristics such as name, timeline, a list of objects to animate among the objects present in the scene and set of key frames associated with each object. The set of key frames indicate when changes to the characteristics of the objects (i.e., position, scale, rotation, transparency) present in the animation must be activated.

In one exemplary embodiment, the scene node may be combined with the location node to generate a self-guided outdoor walking tour and self-guided indoor walking tour. For the self-guided outdoor walking tour, the GPS location nodes may be used to trigger location specific content contained in the scene node. For the self-guided indoor walking tour, the beacon location node may be used to trigger the scene node in specific rooms of a museum. In another exemplary embodiment, the scene node may be combined with the scene node for an interactive panorama exploration. The animation editor may be used to link together a series of panoramas that may be explored by linking together multiple scene nodes.

In one embodiment, the timer node may display a notification related to the visiting spot to the visitor 106. The notification is displayed for a predefined period. The notification is one of a text message or a visual message. Further, the timer node provides an ability to specify an amount of time (e.g., the predefined time) for which the timer node is active. The timer node further provides an ability to toggle a language of text that may appear on the timer node. The timer node further provides an ability to change the name of the timer node for easy identification. The timer node further provides an ability to display visuals related to the visiting spot for the duration of the timer node. The timer node provides an ability to toggle stereoscopic vision ON and OFF for content of the timer node. The timer node provides an ability to give text instructions to the visitor 106 via a fully editable text box. The timer node further provides an ability to assign a next node to start after the predefined period of the timer node is over, when used in combination with other nodes.

In one embodiment, the timer node displays digital content for a predefined period of time on the visitor device 108. For example, the timer node may display timed information, such as a welcome message, onto the visitor device 108. The timer node may comprise a name to identify the node in the tour graph. In some embodiments, the timer node provides textual information, informative videos, or images. In some embodiments, the timer node displays a time limit. Further, the timer node displays the next node once the time limit exceeds.

In one exemplary embodiment, the timer node may be used with the scene node and the location node for escape rooms. When racing a clock is part of the fun, the countdown for the visitor 106, to find and view objects, solve puzzles, or get to a trigger location, is set. Further, informational videos with the scene node, and time puzzles with the timer node are displayed to the visitor 106. Further, additional scenes are triggered based on a location of the visitor 106 that is received using the location node.

In another exemplary embodiment, the timer node may be used with any other node for the experience of discussion prompts. For example, assume the augmented reality tour has complex or heavier topics that the visitor 106 needs time to digest. After the scene node, the timer node is placed to give distraction-free time for the visitor 106 to think. In yet another embodiment, the timer node is combined with the scene node for crowd flow management experience. For situations, like high volume sites where the visitor 106 must keep moving, the timer node is combined with the scene node.

In one embodiment, the full screen video node displays Two-Dimensional (2D) videos associated with the visiting spot to the visitor 106. The videos are displayed in a full screen view on the visitor device 108. The full screen node provides an ability to toggle a language of text of the full screen node. The full screen node provides an ability to change name of the full screen node for easy identification. Further, the full screen node provides an ability to add a video to play that fills the entire screen of the visitor device 108. The full screen node further provides an ability to toggle stereoscopic vision ON and OFF for content of the full screen node. The full screen node provides an ability give text instructions to the visitor 106 via a fully editable text box. The full screen node provides an ability to assign a next node to start after the linked video finishes.

In one exemplary embodiment, the full screen node is combined with the menu node and the scene node. Further, information associated with the visiting spot is displayed in a front area and a center area of the screen of the visiting device 108. Further, the menu node is linked to the full screen node to ask the visitor 106 if the visitor 106 understood the content displayed on the screen. If the visitor 106 does not understand the content, the visitor may be taken down to a path with additional orientation materials.

In one embodiment, the instant tracking node allows the visitor 106 to tap on the screen of the visitor device 108 to place the content contained in a connected scene node. The visitor 106 is further able to instantly track the content of the visitor's choice. The instant tracking node further provides an ability to toggle a language of text of the instant tracking node. The instant tracking node further provides an ability to name the instant tracking node for easy identification. Further, the instant tracking node provides an ability to add preview images and videos that appear on screen of the visitor device 108 to guide or orient the visitor 106. The instant tracking node provides an ability to toggle stereoscopic vision ON and OFF for content of the instant tracking node. The instant tracking node provides an ability to give text instructions to the visitor 106 via a fully editable text box. Further, the instant tracking node provides an ability to assign a next node to start after the instant tracking node finishes.

In one embodiment, the instant tracking node allows the visitor 106 to anchor digital objects on a floor, a thing, or other surface. The digital objects contained in the scene connected to the instant tracking node are then anchored on a selected surface. The instant tracking node may be used to involve the visitor 106 by making the visitor 106 a director of the scene. In one embodiment, the visitor 106 may decide a location to place the objects in the scene and then proceed with exploration of the objects by walking around the objects. In one embodiment, the anchor is placed in the real world and then links the scene to the anchor. The anchor may be created and placed within the tour and then linked with the scene. The instant tracking node requires specifying instructions in text form, video form, or images form. The instant tracking node is configured to specify a reference of the scene node to an anchor.

In one exemplary embodiment, the instant tracking node is used in combination with the scene node for home experience. A ticket stub or gallery guide is scanned to replay scenes from an exhibit on the visitor's coffee table. The instant tracking node allows the visitor 106 to define a surface to pin the content of an attached scene node. In another exemplary embodiment, the instant tracking node is combined with the scene node and the location node. This may be used for example when placing a new monument down on a cityscape. Further, the location node is used to define a content area, and then allow the visitor to alter the view using the instant tracking node linked to the scene node to place content on a landscape.

In one embodiment, the pause node is configured to temporarily stop display of information associated with the tour place to the visitor 106. The pause node provides an ability to toggle a language text of the pause node. The pause node further provides an ability to change name of the pause node for easy identification. The pause node further provides an ability to add preview images and videos that appear on screen of the visitor device 108 to guide or orient the visitor 106. The pause node further provides an ability to put the visitor device 108 into a sleep mode. Further, the pause node provides an ability to give text instructions to the visitor 106 via a fully editable text box. The pause node provides an ability to assign a next node to start once the visitor device 108 is woken up. Further, the pause node provides an ability to set a default timer and the next node.

In one embodiment, the pause node is configured to pause the tour until the visitor 106 decides to continue the tour. The tour may be paused by the visitor 106 using a specific pause function to suit personal needs, and then reactivated with a resume function when the visitor 106 is ready to continue with the tour. The pause node, on the other hand, comprises a specific purpose in the tour designing. For example, when the visitor 106 is in very large areas and the movements between one visiting spot and another visiting spot take many minutes. The pause node is combined with other nodes to pause the tour i.e., until the visitor 106 travels from the one visiting spot to another visiting spot. In an example, the pause node may be combined with the timer node. The timer node instructs the visitor 106 to move towards a distant spot and to reactivate the tour when the visitor 106 is near the destination. The pause node puts the visitor device 108 on standby during long journey of the visitor 106 from one stop to another stop. The visitor device 108 may be reactivated using a specific resume icon. During the pause, rendering and tracking functions of the visitor device 108 are disabled, allowing a considerable saving of battery, and lowering the temperature of the visitor device 108.

In one exemplary embodiment, the pause node may be used in combination with the scene node, the timer node, the location node and again the scene node. For tours that take place over long distances or durations, the pause node is added between scenes that may help to conserve a battery of the visitor device 108 between the visiting spots of the tour place. Assume the tour of expansive outdoor spaces or museums with multiple floors. After watching the content in the scene node at a themed fountain in a historic park, a preview image and written instructions contained in the timer node are displayed to the visitor 106. The visitor 106 may be asked to continue down the path until the visitor 106 reaches a tea house (e.g., that takes several minutes to reach on foot). The timer node further transitions to the pause node to conserve energy until the visitor 106 reaches the tea house. Once the tea house is reached, the visitor 106 may wake the visitor device 108, and the pause node further transitions to the location node (GPS setting) to queue up location-relevant content contained in an attached scene node.

Once the plurality of nodes is generated, the application server 110 further modifies a combination of the one or more nodes from the plurality of nodes. The modification of the combination of the one or more nodes further leads to creating tour paths in the augmented reality tour. The tour paths may be optimized paths for the augmented reality tour. The modification corresponds to at least one of adding, deleting, and rearranging the one or more nodes. In one example, the plurality of nodes e.g., the menu node, the marker node, the scene node, the location node, the timer node, the full screen node, the instant tracking node, the pause node may be generated at each point of interest. Further, the combination of the plurality of nodes may be changed to generate an optimized tour for the visitor 106. Based on changing the combination, bifurcated paths may be generated in the augmented reality tour for a plurality of visitors.

In one embodiment, the augmented reality tour is generated using a wizard function. The wizard function helps the user 102 to generate the augmented reality tour based on step by step asking of questions related to the augmented reality tour. In an embodiment, the wizard function asks or "nudges" multiple questions related to the augmented reality tour to the user 102. In one example, the multiple questions may be related to the visiting preferences of the visitor 106, the type of the tour, and the like. Further, answers related to the multiple questions are received from the user 102 and analyzed by the wizard function. Upon analysis, the wizard function generates the augmented reality tour for the visitor 106. Once the augmented reality tour is generated, the augmented reality tour is published. The augmented reality tour may be available at a specific Uniform Resource Locator (URL) via a web application. The visitor 106 further uses the visitor device 108 to access the URL. The visitor device 108 includes, but is not limited to, smartphones, smart glasses, web and VR devices, and the like. In one example, the URL may be available as a text message or a QR code.

In one embodiment, the combination of the plurality of nodes determines a course of the augmented reality tour. In one embodiment, the plurality of nodes may be combined manually by the user 102 or assembled automatically by the wizard function. In the wizard function, a series of questions may be asked to the user to understand what kind of tour is to be generated. Further, an initial sequence of the plurality of nodes may be generated automatically. Further, the sequence of the plurality of nodes (e.g., combination of nodes) may be modified based on inputs from the visitor 106. In an embodiment, a clone of a previously generated tour may be generated based on inputs from the user 102.

In the augmented reality tour, the connection between the plurality of nodes occurs explicitly by adding child nodes to a father node. In one example, in a scene node, the connection between the nodes occurs by adding user actions associated with objects present in the node. The link may be made by clicking on option associated with the objects. In an embodiment, the scene node is used to view digital content anchored to the real world. The anchors take place in relevant positions for the purposes of the narrative, for example in a painting, a statue, an archaeological find, etc. The objects within the scene (e.g., the scene node) are dynamic because the viewing perspective changes when the visitor moves and may then appreciate different aspects of the digital content. Further, the digital object may be animated (e.g., changing shape, position, and orientation) using a specific tool known as the animation editor.

In an embodiment, the animation editor may comprise basic elements such as, a timeline in that an event takes place, and a series of keyframes in which the event takes place. The event may be user event (e.g., a click) or timed events. For example, an event may include from 10 second to 20 second rotate the object by 10 degrees. In the example, interpolation algorithms are used for the gradual transformation of the objects in the interval of defined time (e.g., in 10 seconds, the visitor must rotate by 10 degrees, and thus, 1 degree per second). In an example, transformations include one of a position in three-Dimensional (3D) space, rotation in 3D space, 3D scale, transparency, and playback if the geometry provides.

In one embodiment, the user 102 is able to customize the augmented reality tour for the visitor 106 based on input from the visitor 106. The user 102 may utilize a tour editor to customize the augmented reality tour. In one embodiment, when the augmented reality tour has been created utilizing the wizard function, the user 102 may customize the augmented reality tour by utilizing the tour editor. In some embodiments, the tour editor comprises two main sections such as an object bar and a canvas. The object bar may be opened by interacting, e.g., right clicking, a tour node. The menu allows the user to add new nodes, access the node and scene editors, remove nodes, and assign the main node (e.g., the menu node) that initiate the experience of the augmented reality tour.

The object bar includes at least one of a location object, a marker object, a timer object, a menu object, and a scene object. The location object includes at least the set of GPS coordinates and signals from the virtual (digital) beacons and the physical beacon. The GPS is generally available outdoors while the digital and physical beacons may be used indoors and outdoors. In one example, the physical beacons are small transmitters equipped with a long-life battery (e.g., 24 months at least). In an exemplary scenario, the physical beacons may include various models that might be fixed on trees, walls, or poles. The virtual beacons are generated within the system may be utilized to trigger the content. Inputting the GPS positions and the physical and virtual beacons simultaneously triggers the visitor's position irrespective of whether the visitor 106 is indoors or outdoors. In one embodiment, the physical beacons are associated with multiple attributes that may be configured by utilizing an application. The attributes for each physical beacon include at least one of a transmission power, the UUID, a code, a range, and the list of coordinates. In one example, when the user inputs the latitude, the longitude, and a maximum distance for the GPS location, the location should be triggered respectively to output the latitude, the longitude, and the range. For each location, the visitor 106 must identify the corresponding scene that has to be automatically activated once the visitor 106 reaches the location. In one embodiment, the corresponding scene may be selected using a drop-down list.

The marker object may be utilized by a camera of the visitor device 108 to recognize a scene or view seen by the visitor 106. Adding a new marker object requires an availability of a picture of a target that is captured from a perspective of the visitor 106. In one embodiment, multiple pictures may be added to represent all the views that need to be tracked. Each view could be linked to a scene. In one embodiment, multiple views may be linked to the same scene if the user 102 needs to track the same view from different perspectives or with different lighting conditions.

Further, during the augmented reality tour, informative messages are provided to the visitor 106 to reach specific positions or to perform actions. The timer object is a scene with a predefined duration, and includes text, video, audio, images, and related subtitles that are rendered in full screen mode into the screen of the visitor device 108. At the end of the predefined time, the augmented reality tour moves to a next scene (next stop). The user may select the next scene 102 with a drop-down list.

The menu object is a list of options with related icons and corresponding scenes to be visited. The menu object may be represented on the visitor device 108 as a full screen grid. In one example, the grid is navigated by utilizing scrolling arrows and interacting with selection options rendered on the screen. The scene object (hereinafter referred to as the "scene editor") generates dynamic AR/VR scenes that react to the visitor's actions during the visit. The scene editor includes the canvas, a toolbox, a timeline, an object bar, an animation bar, and an action bar.

The canvas is a 3D section of the scene editor that corresponds to the 3D real world where the visitor 106 stands during the augmented reality tour. All the objects that are added to the canvas are visible during the scene's playback. The objects in the canvas may be modified using helper functions that may be activated with the object bar. The object bar allows modification of an object. The object bar includes at least one of a rotate button, a move button, a scale button, an alpha button, a go-to button, a start new animation button, and an adjust button.

The move button activates a translation helper to move the object on the canvas such that the object may be visualized in the corresponding position in the real world during the playback of the scene. The rotate button activates a rotation helper to rotate the object around an axis of the object. The scale button activates a scale helper to scale the object (i.e., resize the object). The alpha button enables a setting of the transparency as a percentage value (e.g., 100% fully transparent and 0% fully opaque). The go-to button enables a setting of the "go to next scene" function scene when the visitor 106 interacts (clicks) with the object. In one example, upon interaction, a drop-down list is represented with the available scenes. The start new animation button activates a specific animation represented as a drop-down list with the animations available in the scene. The adjust icon is used for a fine tuning of a position, rotation, scale, and transparency. Upon interaction with the adjust icon, a box will be rendered on the user interface to enable configuration of exact values of the position, rotation, scale, and transparency.

The timeline represents scene changes over time since the objects may be animated using the scene's playback. To create an animation, a time bar needs to be set at the time corresponding to the beginning of the animation and move the object on the canvas using the object bar and then save to generate an initial setting of the scene. Further, steps may be taken to move the time bar to the time corresponding to the end of the scene, move the object to a final position and then save. The scene editor may automatically interpolate all the intermediate positions.

The action bar is utilized to save, cancel, and play/pause a scene. An object may be deleted from the scene using a trash button. The toolbox is utilized to add an object to the scene. The objects available in the toolbox are at least one of 3D models, images, embedded videos, full screen videos, audio, loop videos. In one example, the system supports obj static models and fbx dynamic models for the 3D models, jpg and png format and full transparency for the images, mp4 high-definition video with subtitles for the embedded and full screen videos, mp3 stereo with subtitles for the audio, and mp4 high-definition video with subtitles for loop videos. In one embodiment, an object may be added to the scene by utilizing an add button in a corresponding row of the scene.

The animation bar enables to set an object in the scene as a trigger for a custom animation, such that during the playback if the visitor 106 clicks on the object, the animation starts. The animation bar includes all the available animations, and enables addition or deletion of an animation using respective buttons by way of adding a new animation tab or deleting the current animation tab. To add a custom animation to an object: the user 102 needs to click on the object, then the user 102 needs to click on the icon, and then select the corresponding animation from a drop-down list. To configure an animation, the user 102 needs to select the animation from the tab on the right. On selection, the timeline from the current animation is swapped with the selected animation, and then the user 102 may proceed to modify the animation. Various other functionalities and operations of the application server 110 have been described in detail in conjunction with FIGS. 2-7.

In one embodiment, the tour generating platform encourages a collaborative creation of experiences. The tour generating platform comprises a team concept that allows a team to generate a tour. Each team may comprise a team leader. The team leader is able to invite other members to join the team. In an embodiment, generation software is usually designed for a single user while the present disclosure talks about the tour generating platform in which the team may work together on the tour. The tour generating platform allows the team members to share tours and assets (e.g., contents) among different team members. The tour generating platform may be configured to make tours available in public areas. All users and teams participating in the platform may have access to the tours and may be able exchange experiences related to the tour generating platform. In order to facilitate sharing, all tours and assets may be organized into folders so that the user may share entire folders of tours or assets. In one example, the sharing of tours with the team members may help to train new users for generating the augmented reality tour.

In one embodiment, the tour generating platform allows the user to generate the tour in multiple languages. The tour is designed only once, and all the digital assets associated with the tour may have different versions based on different languages. In an embodiment, decoupling between the structure of the tour (e.g., the nodes) and content allows the user to have versions of the contents.

Figure 2:
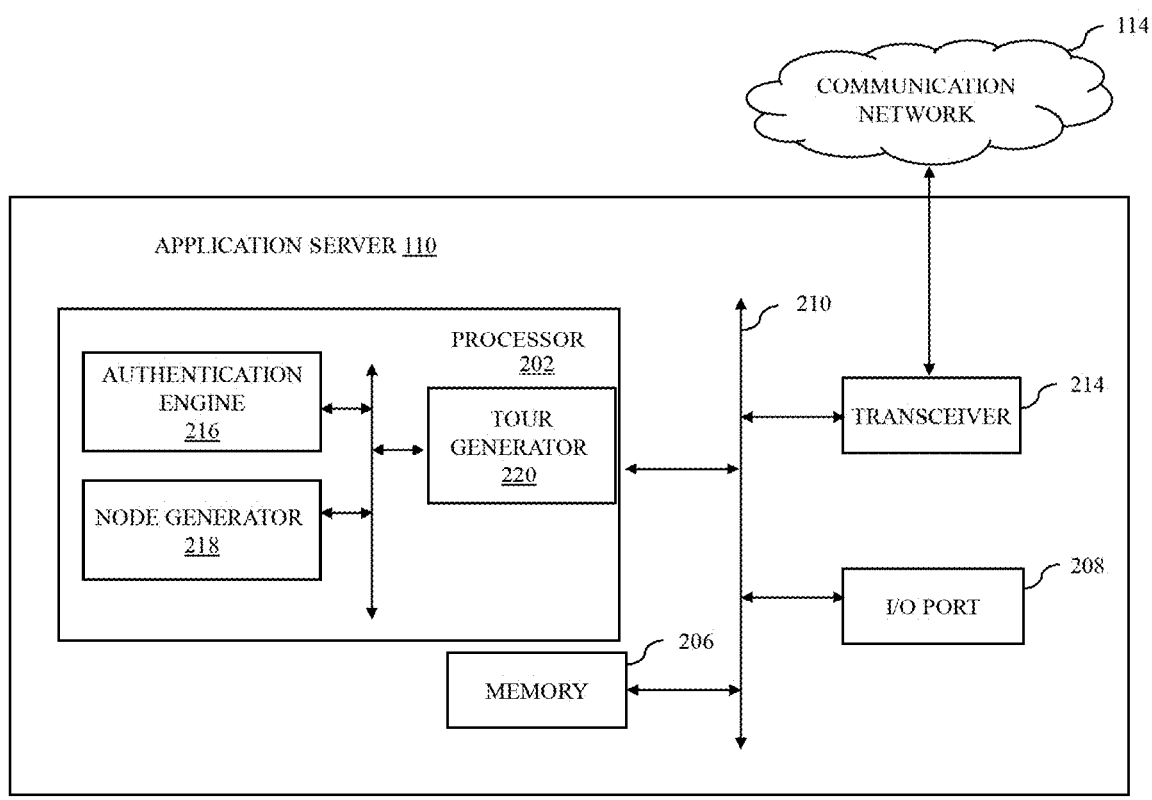
FIG. 2 is a block diagram that illustrates an application server of the system of FIG. 1 for generating the augmented reality tour, in accordance with an embodiment of the disclosure.

FIG. 2 is a block diagram that illustrates the application server 110 of the system for generating the augmented reality tour, in accordance with an embodiment of the disclosure. An embodiment of the disclosure, or portions thereof, may be implemented as computer readable code on the system for generating the augmented reality tour. In one example, the application server 110 and the database server 112 of FIG. 1 may be implemented in the system using hardware, software, firmware, non-transitory computer readable media having instructions stored thereon, or a combination thereof and may be implemented in one or more computer systems or other processing systems. Hardware, software, or any combination thereof may embody modules and components used to implement the method for generating the augmented reality tour of FIGS. 4A-4C.

The application server 110 may include a processor 202 that may be a special purpose or a general-purpose processing device. The processor 202 may be a single processor, multiple processors, or combinations thereof. The processor 202 may have one or more processor "cores." Further, the processor 202 may be connected to a communication infrastructure 204, such as a bus, a bridge, a message queue, multi-core message-passing scheme, or the like. The processor 202 may further comprise an authentication engine 216, a node generator 218, and a tour generator 220. The authentication engine 216, the node generator 218, and the tour generator 220 may be configured to execute the steps of the method for generating the augmented reality tour as mentioned in FIGS. 4A-4C.

In an embodiment, the authentication engine 216 is configured to receive credentials from a user 102. The credentials comprise one of a contact number, an email identifier, a password, and the like. Further, the authentication engine 216 authenticates the received credentials to generate the augmented reality tour for a visitor 106.

Further, the node generator 218 is configured to receive information associated with a tour place upon authentication of the credentials. The information associated with the tour place comprises at least one of images of the tour place, videos of the tour place, and spot preferences of the visitor. Further, a set of points of interest associated with the tour place are selected based on the information associated with the tour place. Each point of interest indicates a visiting spot of the tour place. Furthermore, the node generator 218 is configured to generate a plurality of nodes associated with each point of interest of the set of points of interest. The plurality of nodes includes at least one of a menu node, a marker node, a location node, a scene node, a timer node, a full screen video node, an instant tracking node, and a pause node. Upon generating the plurality of nodes, a trigger may be assigned to each generated node of the plurality of nodes. The trigger indicates an action to be executed at each node of the plurality of nodes.

Further, the tour generator 220 is configured to generate the augmented reality tour based on the plurality of nodes. In one embodiment, the plurality of nodes may be combined in a sequence to generate a sequence of nodes. Subsequently, a combination of one or more nodes of the plurality of nodes is modified to create tour paths in the augmented reality tour. The modification corresponds to at least one of adding, deleting, and rearranging the one or more nodes. Thus, the augmented reality tour is generated in real-time. The visitor 106 may be further able to access the augmented reality tour using the visitor device 108. In some embodiments, the nodes are linked. In some embodiment, data may be assigned to each node of the plurality of nodes for use with a next node in the sequence of nodes. The plurality of nodes for each point of interest is combined into the sequence of nodes to generate the augmented reality tour. The data may correspond to instructions for transition of each node to the next node in the sequence of nodes.

The application server 110 may further include a memory 206. Examples of the memory 206 may include RAM, ROM, and the like. Further, the removable storage drive may read from and/or write to a removable storage device in a manner known in the art. In an embodiment, the removable storage unit may be a non-transitory computer readable recording media.

The application server 110 may further include an input/output (I/O) port 210, a communication interface 212, and a transceiver 214. The I/O port 210 may include various input and output devices that are configured to communicate with the processor 202. Examples of the input devices may include a keyboard, buttons, a mouse, a joystick, a touchscreen, a microphone, and the like. Examples of the output devices may include a display screen, a speaker, headphones, smart glasses, and the like. The communication interface 212 may be configured to allow data to be transferred between the application server 110 and various devices that are communicatively coupled to the application server 110. Examples of the communication interface 212 may include a modem, a network interface, i.e., an Ethernet card, a communication port, and the like. Data transferred via the communication interface 212 may be signals, such as electronic, electromagnetic, optical, or other signals as will be apparent to a person skilled in the art. The signals may travel via a communications channel which may be configured to transmit the signals to the various devices that are communicatively coupled to the application server 110. Examples of the communication channel may include a wired, wireless, and/or optical medium such as cable, fiber optics, a phone line, a cellular phone link, a radio frequency link, and the like.

Further, the transceiver 214 is configured to transmit information or receive information via the communication interface 212. The memory 206 may refer to non-transitory computer readable mediums that may provide data that enables the application server 110 to implement the method for generating the augmented reality tour illustrated in FIGS. 4A-4C.

Figure 4A:
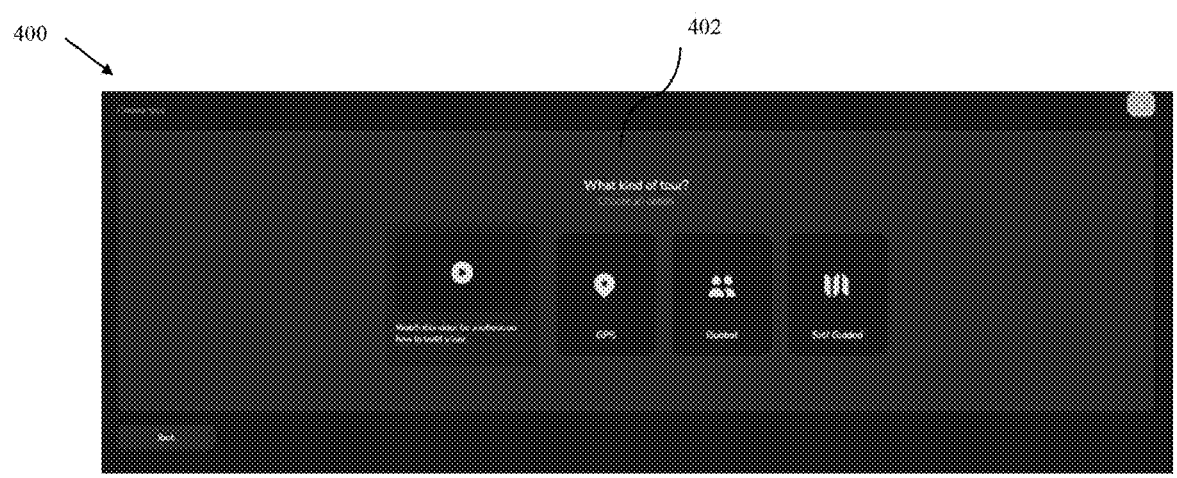
FIGS. 4A-4C, collectively, represent user interface screens for generating a new tour, in accordance with an embodiment of the disclosure.
Figure 4B:
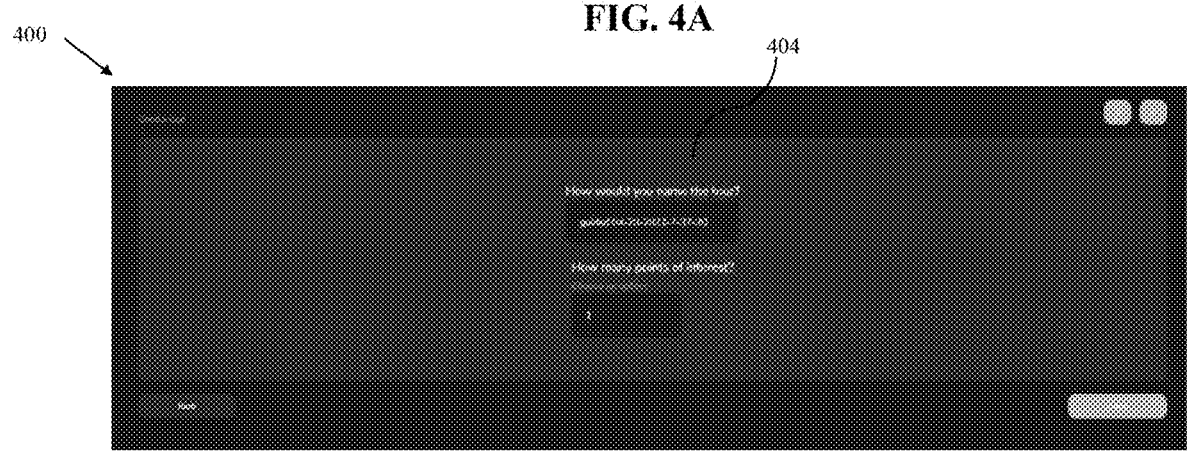
Figure 4C:
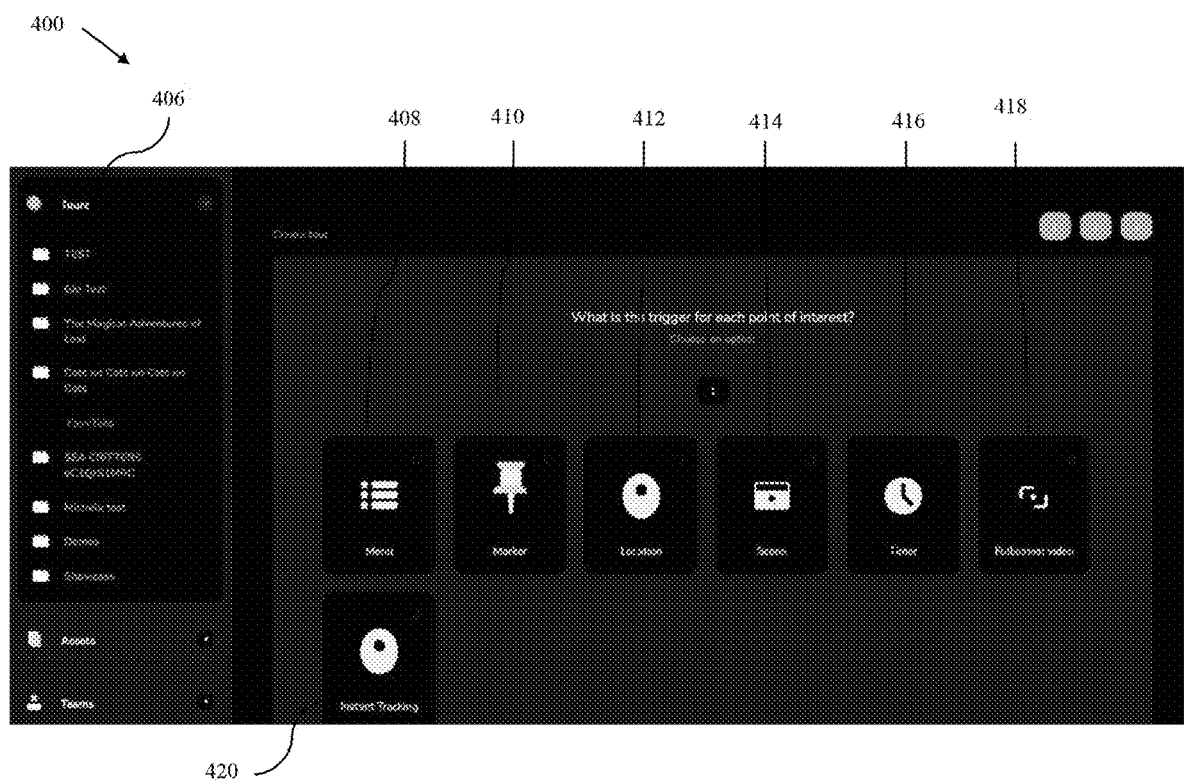

FIGS. 4A-4C, collectively, represent generating a new tour 400, in accordance with an embodiment of the present subject matter. In an embodiment, the new tour may be referred as an augmented reality tour. The augmented reality tour may be represented through a sequence of information nodes connected to each other to form a tree of narrative sequences. The main nodes in a tour generating platform are scene nodes and connection nodes. The scene nodes may represent an augmented reality scenes that overlap with reality through pinning of contents. The scenes may be full screen scenes that are fixed on a screen. Further, the connection nodes include timers, visual markers, instant markers, geolocation markers, and menus. In an embodiment, an augmented world may be created using a combination of scenes interconnected using connection nodes.

In an embodiment, the new tour is generated using a wizard function. The wizard function may help the user 102 to generate a new tour based on step by step asking of the right questions at the right time. Referring to FIG. 4A, in one embodiment, at 402, a type of tour may be selected by the user 102 based on input from the visitor 106. The type of tour is one of a GPS tour, a guided tour, and a self-guided tour. The type of tour may include multiple store items developed in different ways depending on the input from the visitor 106. In one example, the self-guided tour may be selected based on the inputs from the visitor 106.

In one embodiment, the GPS tour is an outdoor tour in which the visitor 106 has a digital map with georeferenced points of interest. The GPS tour type may be performed with physical and digital beacons for indoor and outdoor tours. In an embodiment, the guided tour is a group tour lead by a tour guide controlling a fleet of hardware via a transmitter loaded with the Art Glass assistant app or similar application to wirelessly synchronize content across multiple devices. In one embodiment, the GPS tour and the guided tours are non-linear tours by default as content is triggered based on a location of the visitor 106 or the beacon selected by the tour guide. Further, the self-guided tour may be a linear tour, with a rigid succession of the various stages with sequential storytelling or a nonlinear tour. The self-guided tour may include multiple stories related to the visiting spots that may be developed in different ways depending on the choices of the visitor 106.

Upon selecting the type of tour, the user 102 is asked to name the tour at 404. Further, at 404, the user 102 may assign number of visiting spots (e.g., point of interest) for the visitor. In an embodiment, inputs from the visitor for the questions like the type of tour, the name of tour and visiting spots leads to automatically generating a tour framework.

In one embodiment, the tour 406 is generated based on combination of nodes. There may be multiple triggers to each point of interest (e.g., visiting spot) from a set of points of interest. The multiple triggers include at least one of a timer, a location, a marker, a menu, an instant tracking, a scene, and a full screen. In other words, the assigning of the multiple triggers corresponds to generation of the multiple nodes at each point of interest. The timer trigger 416 corresponds to the timer node, the location trigger 412 corresponds to the location node, the marker trigger 410 corresponds to the marker node, the menu trigger 408 corresponds to the menu node, the instant tracking trigger 420 corresponds to the instant tracking node, the scene trigger 414 corresponds to the scene node, and the full screen trigger 418 corresponds to the full screen node.

In an embodiment, the timer trigger 416 is generated automatically after a predefined period. The location trigger 412 is triggered based on a location of the visitor 106. The location is identified based on the GPS, virtual, or physical beacons. The menu trigger 408 is triggered to make options available to the visitor 106. The instant tracking trigger 420 is triggered based on selecting a surface or a specific scene. The scene trigger 414 is triggered instantly without an outside direction. The full screen trigger 418 is triggered instantly without outside direction and takes up the entire screen.

In one embodiment, the GPS tour and the guided tour may be non-linear by default as content is triggered based on where the visitor 106 is located or the beacon that the user selects. In some embodiments, for self-guided tours, the wizard sets the number of options for each trigger to one, producing a linear tour. The user may be able to add options to the trigger with a tour editor generating a nonlinear tour. In the nonlinear tour, the visitor 106 may choose spots to go and generate multiple possible stories and pathways.

Figure 5A:
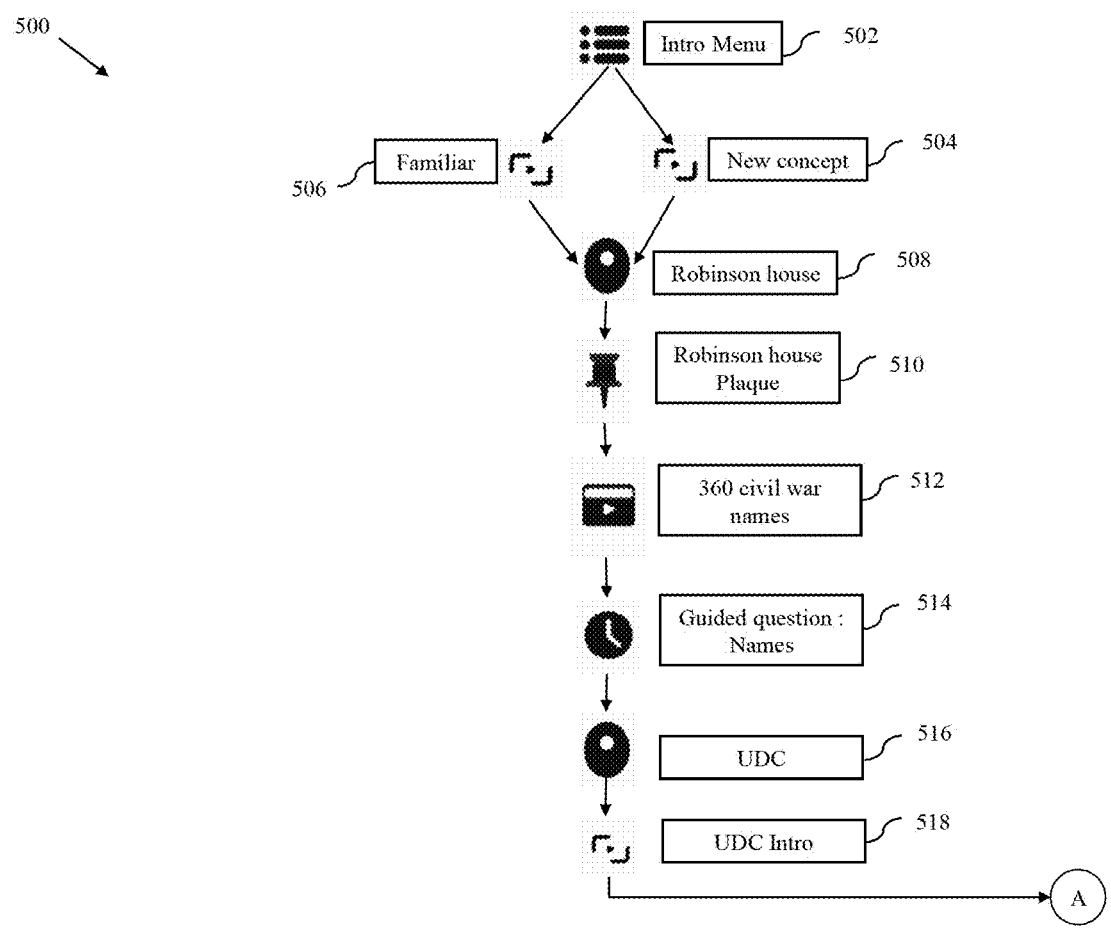
FIGS. 5A-5B, collectively, represent a flow diagram that illustrates an exemplary embodiment of a method for generating an augmented reality tour, in accordance with an embodiment of the disclosure.
Figure 5B:
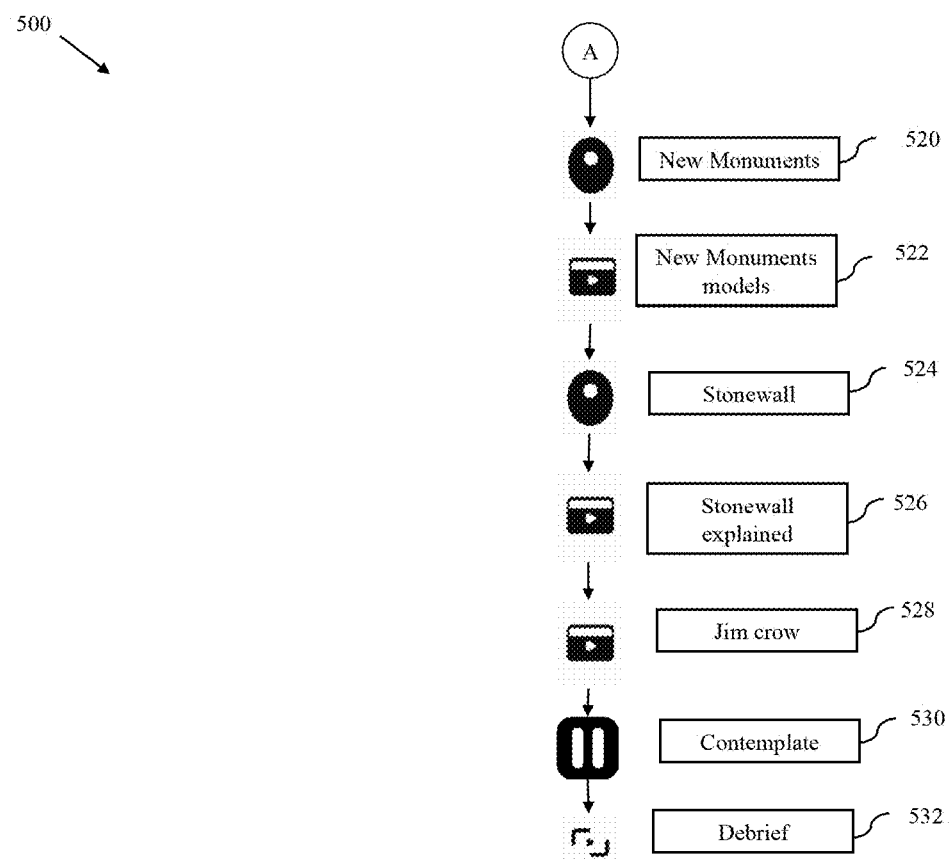

FIGS. 5A-5B, collectively, represent a flow diagram 500 that illustrates an exemplary embodiment of a method for generating an augmented reality tour, in accordance with an embodiment of the disclosure. In one embodiment, at 502, the augmented reality tour starts with a menu node asking a visitor 106 if the visitor 106 is familiar with concept of "The Lost Cause." If yes, a short refresher video may be displayed on a screen of a visitor device 108, at 506, by transition of the menu node into a full screen node. If the visitor 106 is not familiar with the concept of "The Lost Cause", a longer orientation video may be displayed on the screen of the visitor device 108, at 504, by transition of the menu node into the full screen node. In an embodiment, a bifurcated path for the long video and the short video is created.

Further, at 508, the full screen node is transitioned into a location node to find a location of a first stop (e.g., Robinson House) for the visitor 106. The location node uses GPS coordinates of the Robinson house. Furthermore, at 510, the location node is transitioned to a marker node to refine the location by having the visitor 106 scan an information plaque in front of the house (e.g., Robinson House Plaque).

At 512, the marker node is transitioned to a scene node to immerse the visitor 106 in a 360-degree scene (e.g., 360 Civil War Names). Further, at 514, the scene node is transitioned to a timer node to give 5 minutes to the visitor 106 to think about the questions and content posed to them in the previous scene (e.g., Guided Question: Names). At 516, the scene node is transitioned to the location node to take the visitor 106 to a next destination (e.g., UDC). Further, at 518, an intro video for a new location (e.g., the next destination) is displayed on the visitor device 108 with another full screen node (e.g., UDC intro).

At 520, the full screen node is transitioned to an instant tracking node with instructions for the visitor 106. Further, an explanation video on how to use the tap-to-place feature (e.g., New Monuments) is shown to the visitor 106 at the instant tracking node. At 522, the instant tracking node is transitioned to the scene node containing 3-Dimensional models that the visitor 106 may place via the instant tracking node to alter a cityscape in front of the visitor 106 (e.g., New Monuments Models).

At 524, the scene node is transitioned to the location node to take the visitor 106 to the next stop (e.g., Stonewall). Further, at 526, the location node is transitioned to the scene node introducing the new stop (e.g., Stonewall Explained). At 528, another scene node is played with a heavy topic (e.g., Jim Crow). At 530, the visitor is instructed to digest the information of the scene node, and a pause node allows the visitor 106 to resume when ready (e.g., Contemplate). Step 532, the pause node is transitioned to a full screen node to debrief the visitor.

In one exemplary embodiment, assume a user 102 is generating an augmented reality tour for a visitor 106. Initially, assets or content in an outside program (e.g., Photoshop or MS paint) are generated. In one embodiment, existing content (e.g., photographs from an archive) are received and saved to a user device 104. Further, the received content is uploaded into an asset folder of the tour generating platform. The user 102 may be able to add more assets. Once the assets are available, the user 102 clicks on a tour icon available on the tour generating platform to generate the augmented reality tour. Further, a type of augmented reality tour may be selected based on an input from the visitor 106. In one example, the type of the augmented reality tour is a self-guided tour. Furthermore, the user 102 may assign a name to the augmented reality tour.

Subsequently, multiple points of interest e.g., visiting spots are selected based on information received from the visitor 106. Further, a trigger is assigned to each visiting spot from the multiple visiting spots. In an embodiment, the visiting spots may be added or deleted based on the information from the visitor 106. Upon assigning the trigger, a plurality of nodes is generated at each visiting spot. Further, a combination of the plurality of nodes may be modified to generate a bifurcated path for the visitor 106 in the augmented reality tour. In an embodiment, the modification may include one of addition of nodes, deletion of nodes or re-arranging of nodes.

In one example, assuming the self-guided tour is for the visitor 106, the user 102 may delete "Familiar" and "New Concept" full screen Nodes. Further, an "Add Child Node" feature is used to add new nodes. The addition of the child node to the father node creates bifurcated paths in the augmented reality tour. Further, in order to connect the scene back to the rest of the augmented reality tour, simply assign the node content to transition to a designated "next node". In the example, a full screen video may be added to the full screen node under the "Asset" heading. In case of stops other than scene nodes, content may be added to a main node screen. Further, in case of "Intro Menu" e.g., the menu node, multiple distinct paths may be created by adding action icons and assigning different action icons to different next nodes. In case of the scene nodes, content may be added using the scene editor. The user 102 may be able to animate the content like images and Three-Dimensional (3D) models using the built-in animated editor.

Figure 6A:
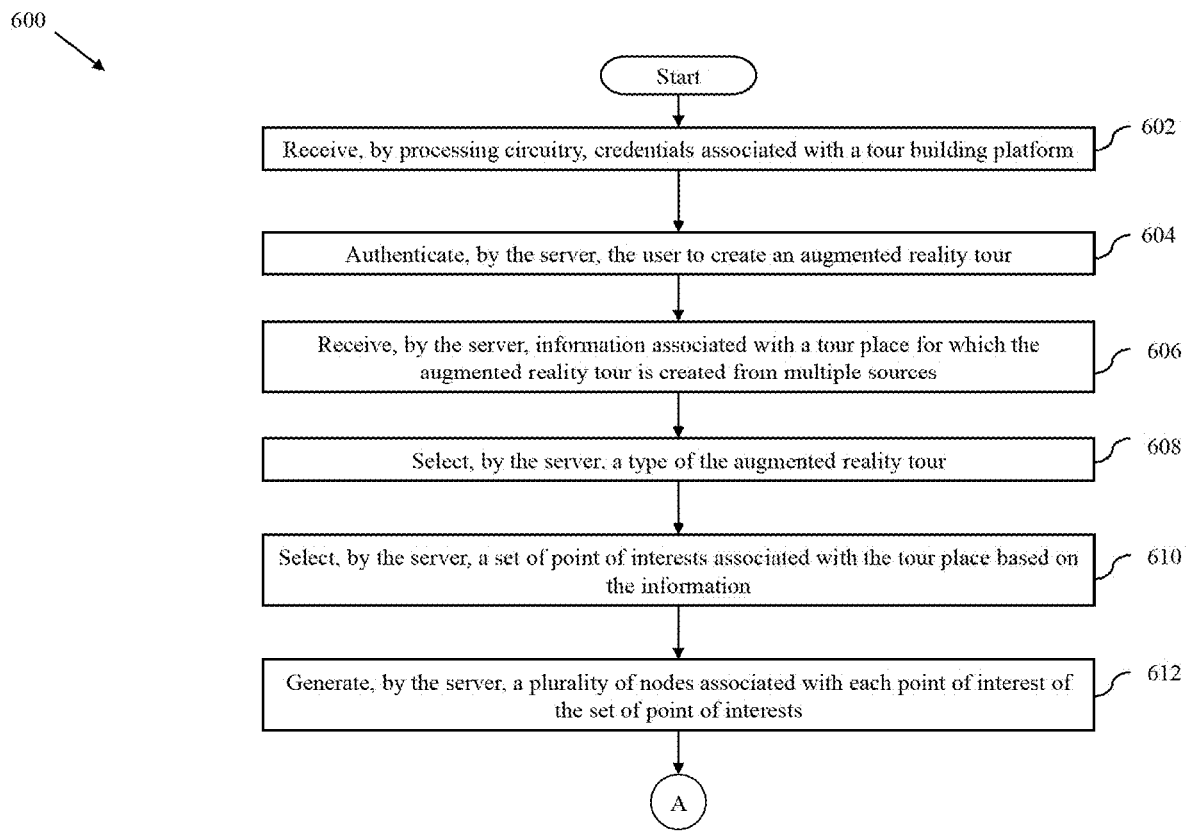
FIGS. 6A-6B, collectively, represent a flow chart that illustrates a method for generating an augmented reality tour, in accordance with an embodiment of the disclosure.
Figure 6B:
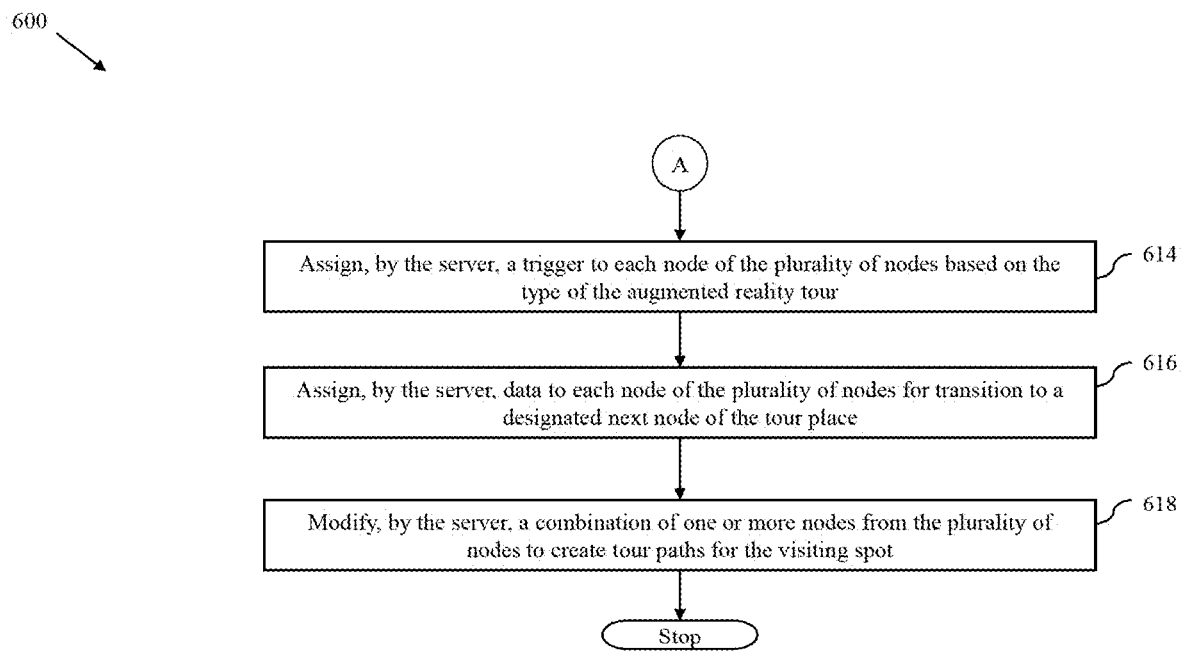

FIGS. 6A-6B, collectively, represent a flow chart 600 that illustrates a method for generating the augmented reality tour, in accordance with an embodiment of the disclosure.

The method is initiated at 602 when credentials associated with a tour generating platform are received. The credentials include at least one of a contact number, a login identifier (ID), an email identifier (ID), and a password. Further, at 604, the received credentials are authenticated to generate an augmented reality tour for a visitor.

At 606, information associated with a tour place is received upon authentication of the credentials. In one embodiment, the information associated with the tour place comprises at least one of images of the tour place, videos of the tour place, and spot preferences of the visitor.

At 608, a type of augmented reality tour is selected based on an input from the visitor. In one embodiment, the type of the augmented reality tour is one of a self-guided tour, a Global Positioning System (GPS) tour, and a guided tour.

At 610, a set of points of interest associated with the tour place is selected based on the information associated with the tour place. In one embodiment, each point of interest indicates a visiting spot of the tour place.

At 612, a plurality of nodes associated with each point of interest of the set of points of interest is generated. In one embodiment, the plurality of nodes includes at least one of a menu node, a marker node, a location node, a scene node, a timer node, a full screen video node, an instant tracking node, and a pause node.

At 614, a trigger is assigned to each node of the plurality of nodes based on the type of the augmented reality tour. In one embodiment, the trigger indicates an action to be executed at each node of the plurality of nodes.

At 616, data is assigned to each node of the plurality of nodes for transition to a next node from the plurality of nodes of the tour place.

At 618, a combination of one or more nodes of the plurality of nodes are modified to create tour paths in the augmented reality tour. In one embodiment, the modification corresponds to at least one of adding, deleting, and rearranging the one or more nodes, thus generating the augmented reality tour in real-time.

Figure 7:
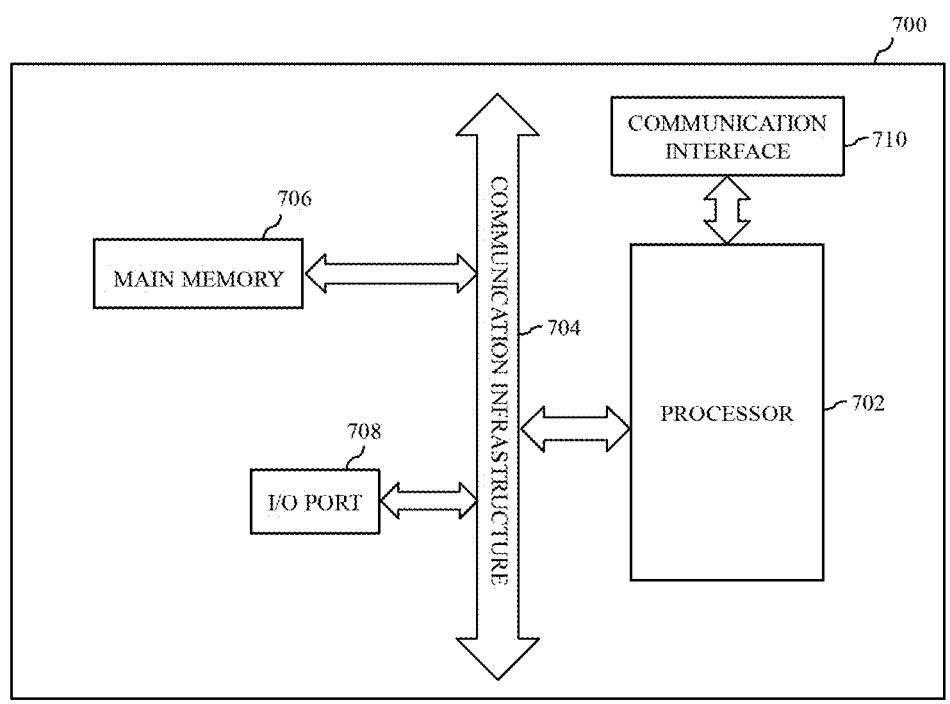
FIG. 7 is a block diagram that illustrates a block diagram of the computer system for generating an augmented reality tour, in accordance with an embodiment of the disclosure.

FIG. 7 is a block diagram that illustrates a block diagram of the computer system 700 for generating an augmented reality tour, in accordance with an embodiment of the disclosure. An embodiment of the disclosure, or portions thereof, may be implemented as computer readable code on the computer system 700. In one example, the application server 110 and the database server 112 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the method for generating the augmented reality tour as explained in FIGS. 6A-6B.

The computer system 700 may include a processor 702 that may be a special purpose or a general-purpose processing device. The processor 702 may be a single processor, multiple processors, or combinations thereof. The processor 702 may have one or more processor "cores." Further, the processor 702 may be connected to a communication infrastructure 704, such as a bus, a bridge, a message queue, multi-core message-passing scheme, or the like.

The computer system 700 may further include a memory 706. Examples of the memory 706 may include RAM, ROM, and the like. Further, the removable storage drive may read from and/or write to a removable storage device in a manner known in the art. In an embodiment, the removable storage unit may be a non-transitory computer readable recording media.

The computer system 700 may further include an input/output (I/O) port 708 and a communication interface 710. The I/O port 708 may include various input and output devices that are configured to communicate with the processor 702. Examples of the input devices may include a keyboard, buttons, a mouse, a joystick, a touchscreen, a microphone, and the like. Examples of the output devices may include a display screen, a speaker, headphones, smart glasses, and the like. The communication interface 710 may be configured to allow data to be transferred between the computer system 700 and various devices that are communicatively coupled to the computer system 700. Examples of the communication interface 710 may include a modem, a network interface, e.g., an Ethernet card, a communication port, and the like. Data transferred via the communication interface 710 may be signals, such as electronic, electromagnetic, optical, or other signals as may be apparent to a person skilled in the art. The signals may travel via a communications channel which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The memory 706 may refer to non-transitory computer readable mediums that may provide data that enables the computer system 700 to implement the method for generating the augmented reality tour illustrated in FIGS. 4A-4C.

The disclosed embodiments encompass numerous advantages. The disclosure provides various methods and systems for generating an augmented reality tour. The disclosed methods and systems provide an efficient way for generating a plurality of nodes and modifying combination of the plurality of nodes in the augmented reality tour. The disclosed methods and systems help the visitor to select the visiting spots in the augmented reality tour in real-time and have real-world experience in the augmented reality tour. The disclosed method and system help the visitor to easily find tour path as the tour paths for the visiting spots are generated based on the plurality of nodes. The disclosed method and system facilitate end-to-end administration of generating the augmented reality tour and all the components of the generation of the augmented reality tour that is not performed using existing technique. Further, all the steps of the generation of the augmented reality tour that are performed automatically may be easily administered leading to higher efficiency and less time and power consumption, which the existing techniques cause a lot of difficulty and waste of time. Additionally, the generation of the augmented reality tour may be preconfigured for 'one-click' administration during the generation which the existing techniques fail to do.

A person of ordinary skill in the art will appreciate that embodiments and scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems, and methods for generating the augmented reality tour. While various embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It will be understood by those within the art that, in general, terms used herein, are generally intended as "open" terms (e.g., the term "including" should be interpreted as "including but not limited to," the term "having" should be interpreted as "having at least," etc.).

What is claimed is:

1. A method for generating an augmented reality tour, the method comprises:
   receiving, by an application server, information associated with a tour place of an augmented reality tour, wherein the information associated with the tour place comprises at least one of images of the tour place, videos of the tour place, and spot preferences of a visitor for the augmented reality tour;
   selecting, by the application server, a set of points of interest associated with the tour place based on the information associated with the tour place, wherein each point of interest indicates a visiting spot of the tour place;
   generating, by the application server, a plurality of nodes associated with each point of interest of the set of points of interest, wherein the plurality of nodes includes at least one of a menu node, a marker node, a location node, a scene node, a timer node, a full screen video node, an instant tracking node, and a pause node; and
   modifying, by the application server, a combination of one or more nodes of the plurality of nodes to create tour paths in the augmented reality tour, wherein the modification corresponds to at least one of adding, deleting, and rearranging the one or more nodes, thereby generating the augmented reality tour;
   wherein the menu node provides a set of action icons associated with the tour paths to the visitor, and wherein each action icon from the set of action icons indicates a next node from the plurality of nodes, and wherein the menu node provides an ability to:
   add images to the set of action icons for finding the tour paths;
   set a default next node with a user-defined timer if no action icon is selected;
   send text instructions to the visitor; and
   assign the next node for each action icon of the menu node.

2. The method as claimed in claim 1, further comprises:
   assigning, by the application server, data to each node of the plurality of nodes for transition to the next node from the plurality of nodes of the tour place.

3. The method as claimed in claim 1, further comprises:
   selecting, by the application server, a type of the augmented reality tour based upon an input from the visitor, wherein the type of the augmented reality tour is one of a self-guided tour, a Global Positioning System (GPS) tour, and a guided tour.

4. The method as claimed in claim 1, further comprises:
   assigning, by the application server, a trigger to each node of the plurality of nodes based on the type of the augmented reality tour, wherein the trigger indicates an action to be executed at each node of the plurality of nodes.

5. The method as claimed in claim 1, wherein the marker node provides a preview of the images and the videos to the visitor in the augmented reality tour, and wherein the marker node provides an ability to:
   provide multiple paths to the visitor via recognition of a set of images of the tour place;
   set a default next node with a user-defined timer if no image is recognized; and
   an ability to add and delete images for recognition in the augmented reality tour.

6. The method as claimed in claim 1, wherein the location node provides a set of GPS coordinates associated with the visiting spot, and wherein the location node provides an ability to:
   set the default next node with a user-defined timer if no GPS or beacon signal is found;
   send text instructions to the visitor via a fully editable text box; and
   add and delete the GPS coordinates and the beacon signal that trigger content of the location node.

7. The method as claimed in claim 1, wherein the scene node provides an augmented reality-based scenes associated with the visiting spot, and wherein the scene node provides an ability to:
   play autonomously without requiring a preceding trigger; and
   assign the next node to start after content in the scene node is complete.

8. The method as claimed in claim 1, wherein the timer node displays a notification related to the visiting spot to the visitor, and wherein the notification is displayed for a predefined period, and wherein the timer node provides an ability to assign the next node to start after the predefined period of the timer node is over.

9. The method as claimed in claim 1, wherein the full screen video node displays two dimensional videos associated with the visiting spot to the visitor, and wherein the full screen node provides an ability to assign the next node to start after a linked video in the full screen node finishes.

10. The method as claimed in claim 1, wherein the instant tracking node allows the visitor to pin a scene associated with the scene node of the visiting spot, and wherein the instant tracking node provides an ability to:
add preview images and videos that appear on screen of a visitor device to guide or orient the visitor; and
assign the next node to start after the instant tracking node finishes.

11. The method as claimed in claim 1, wherein the pause node is configured to temporarily stop display of the information associated with the tour place to the visitor, and wherein the pause node provides an ability to:
assign the next node to start once the visitor device is woken up; and
set a default timer and the next node in the augmented reality tour.

12. The method as claimed in claim 1, wherein the timer node displays a notification related to the visiting spot to the visitor, and wherein the notification is displayed for a predefined period, and wherein the timer node provides an ability to assign the next node to start after the predefined period of the timer node is over, and wherein the full screen video node displays two dimensional videos associated with the visiting spot to the visitor, and wherein the full screen node provides an ability to assign a the next node to start after a linked video in the full screen node finishes.

13. The method as claimed in claim 1, wherein the instant tracking node allows the visitor to pin a scene associated with the scene node of the visiting spot, and wherein the instant tracking node provides an ability to:
add preview images and videos that appear on screen of a visitor device to guide or orient the visitor; and
assign the next node to start after the instant tracking node finishes; and
wherein the pause node is configured to temporarily stop display of the information associated with the tour place to the visitor, and wherein the pause node provides an ability to:
assign the next node to start once the visitor device is woken up; and
set a default timer and the next node in the augmented reality tour.

14. A system for generating an augmented reality tour, the system comprising:
a visitor device, to take an augmented reality tour;
a user device, to generate the augmented reality tour; and
an application server, configured to:
receive information associated with a tour place of an augmented reality tour, wherein the information associated with the tour place comprises at least one of images of the tour place, videos of the tour place, and spot preferences of a visitor for the augmented reality tour;
select a set of points of interest associated with the tour place based on the information associated with the tour place, wherein each point of interest indicates a visiting spot of the tour place;
generate a plurality of nodes associated with each point of interest of the set of points of interest, wherein the plurality of nodes includes at least one of a menu node, a marker node, a location node, a scene node, a timer node, a full screen video node, an instant tracking node, and a pause node; and
modify a combination of one or more nodes of the plurality of nodes to create tour paths in the augmented reality tour, wherein the modification corresponds to at least one of adding, deleting, and rearranging the one or more nodes, thereby generating the augmented reality tour;
wherein the menu node provides a set of action icons associated with the tour paths to the visitor, and wherein each action icon from the set of action icons indicates a next node from the plurality of nodes, and wherein the menu node provides an ability to:
add images to the set of action icons for finding the tour paths;
set a default next node with a user-defined timer if no action icon is selected;
send text instructions to the visitor; and
assign a next node for each action icon of the menu node.

15. The system as claimed in claim 14, wherein the application server is further configured to:
select a type of the augmented reality tour based upon an input from the visitor, wherein the type of the augmented reality tour is one of a self-guided tour, a Global Positioning System (GPS) tour, and a guided tour; and
assign a trigger to each node of the plurality of nodes based on the type of the augmented reality tour, wherein the trigger indicates an action to be executed at each node of the plurality of nodes.

16. The system as claimed in claim 14,
wherein the marker node provides a preview of the images and the videos to the visitor in the augmented reality tour, and wherein the marker node provides an ability to:
provide multiple paths to the visitor via recognition of a set of images of the tour place;
set the default next node with a user-defined timer if no image is recognized; and
an ability to add and delete images for recognition in the augmented reality tour.

17. The system as claimed in claim 14, wherein the location node provides a set of GPS coordinates associated with the visiting spot, and wherein the location node provides an ability to:
set the default next node with a user-defined timer if no GPS or beacon signal is found;
send text instructions to the visitor via a fully editable text box; and
add and delete the GPS coordinates and the beacon signal that trigger content of the location node; and
wherein the scene node provides an augmented reality-based scenes associated with the visiting spot, and wherein the scene node provides an ability to:
play autonomously without requiring a preceding trigger; and
assign the next node to start after content in the scene node is complete.

18. A system for generating augmented reality tours, the system comprising:
an application server for generating the augmented reality tours;
an electronic storage, operably coupled to the application server, that stores images of a tour place;
a user interface, operable with the application server, wherein a user interacts to generate the augmented reality tours; and a node generator, operable with the application server,
wherein the system is configured to:
- identify, using the user interface, the tour place and a type of augmented reality tour, wherein the type of augmented reality tour is one of a self-guided tour, a Global Positioning System (GPS) tour, and a guided tour;
- select, using the user interface, a set of points of interest associated with the tour place, wherein each point of interest indicates a visiting spot of the tour place;
- generate, using the node generator, a plurality of nodes associated with each point of interest in the set of points of interest, wherein the plurality of nodes includes at least one of a menu node, a marker node, a location node, a scene node, a timer node, a full screen video node, an instant tracking node, and a pause node;
- assign a trigger for each generated node of the plurality of nodes, wherein the trigger indicates an action to be executed at each node of the plurality of nodes; and
- assign data to each node of the plurality of nodes for use with a next node in a sequence of nodes, wherein the plurality of nodes for each point of interest is combined into the sequence of nodes to generate the augmented reality tour;
- wherein the menu node provides a set of action icons associated with tour paths for a visitor, and wherein each action icon from the set of action icons indicates the next node from the plurality of nodes, and wherein the menu node provides an ability to:
  - add images to the set of action icons for finding the tour paths;
  - set a default next node with a user-defined timer if no action icon is selected;
  - send text instructions to the visitor; and
  - assign the next node for each action icon of the menu node.

19. The system of claim 18, wherein the user interface comprises: a dashboard and a scene editor, wherein the scene editor includes a canvas section, and wherein the canvas section comprises three-dimensional (3D) editing including manipulation of 3D objects, and wherein the user interface comprises a tour editor including an objects bar and an action bar.

* * * * *